US011082962B2

(12) United States Patent
Park et al.

(10) Patent No.: US 11,082,962 B2
(45) Date of Patent: Aug. 3, 2021

(54) METHOD BY WHICH TERMINAL AND BASE STATION TRANSMIT/RECEIVE SIGNAL IN WIRELESS COMMUNICATION SYSTEM, AND DEVICE FOR SUPPORTING SAME

(71) Applicant: LG Electronics Inc., Seoul (KR)

(72) Inventors: Hanjun Park, Seoul (KR); Seonwook Kim, Seoul (KR); Suckchel Yang, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/610,275

(22) PCT Filed: May 3, 2018

(86) PCT No.: PCT/KR2018/005140
§ 371 (c)(1),
(2) Date: Nov. 1, 2019

(87) PCT Pub. No.: WO2018/203682
PCT Pub. Date: Nov. 8, 2018

(65) Prior Publication Data
US 2020/0267718 A1    Aug. 20, 2020

Related U.S. Application Data

(60) Provisional application No. 62/566,340, filed on Sep. 30, 2017, provisional application No. 62/544,230,
(Continued)

(51) Int. Cl.
*H04W 72/04* (2009.01)
*H04B 1/713* (2011.01)
*H04L 5/00* (2006.01)

(52) U.S. Cl.
CPC ........ *H04W 72/0413* (2013.01); *H04B 1/713* (2013.01); *H04L 5/0048* (2013.01)

(58) Field of Classification Search
CPC .. H04B 1/713; H04L 1/06; H04L 5/00; H04L 5/0048; H04L 5/06; H04W 72/0413
See application file for complete search history.

(56) References Cited

U.S. PATENT DOCUMENTS 9,025,560 B2 * 5/2015 Han ................ H04W 72/0413
370/330
10,785,788 B2 * 9/2020 Kim ................ H04W 72/1268
(Continued)

OTHER PUBLICATIONS

Ericsson, "Robust Transmission Scheme for PUSCH," R1-1705887, 3GPP TSG RAN WG1 Meeting #88bis, Spokane, USA, dated Apr. 3-7, 2017, 5 pages.
(Continued)

*Primary Examiner* — Stephen J Clawson
(74) *Attorney, Agent, or Firm* — Fish & Richardson P.C.

(57) ABSTRACT

Provided are: a method by which a terminal and a base station transmit/receive a signal in a wireless communication system; and a communication device using the method. The method allocates, to a plurality of antenna ports, resources for transmitting a physical uplink control channel (PUCCH) composed of two or less symbols, and transmits, to the base station, the PUCCH through the plurality of antenna ports, wherein the resources allocated to the plurality of antenna ports are multiplexed with each other.

8 Claims, 22 Drawing Sheets

Related U.S. Application Data filed on Aug. 11, 2017, provisional application No. 62/543,955, filed on Aug. 10, 2017, provisional application No. 62/520,522, filed on Jun. 15, 2017, provisional application No. 62/506,518, filed on May 15, 2017, provisional application No. 62/501,056, filed on May 3, 2017.

(56) References Cited

U.S. PATENT DOCUMENTS

| | | | |
|---|---|---|---|
| 2011/0235599 A1* | 9/2011 | Nam | H04W 72/0413 |
| | | | 370/329 |
| 2012/0093090 A1* | 4/2012 | Han | H04L 27/2615 |
| | | | 370/328 |
| 2012/0114014 A1* | 5/2012 | Gaal | H04B 1/713 |
| | | | 375/135 |
| 2012/0269138 A1* | 10/2012 | Han | H04L 1/1671 |
| | | | 370/329 |
| 2017/0019163 A1* | 1/2017 | Yoshimoto | H04L 1/00 |
| 2017/0041103 A1 | 2/2017 | Määttänen et al. | |
| 2017/0257860 A1* | 9/2017 | Nam | H04W 72/0446 |
| 2018/0199335 A1* | 7/2018 | Jung | H04L 1/1812 |
| 2018/0324787 A1* | 11/2018 | Yin | H04L 1/1861 |
| 2019/0223201 A1* | 7/2019 | Lee | H04W 72/1268 |

OTHER PUBLICATIONS

Guangdong OPPO Mobile Telecom, "Discussion on uplink control channel in short duration," R1-1704621, 3GPP TSG RAN WG1 Meeting #88bis, Spokane, USA, dated Apr. 3-7, 2017, 3 pages.
Huawei, HiSilicon, "Transmit diversity for PUCCH," R1-1705064, 3GPP TSG RAN WG1 Meeting #88bis, Spokane, USA, dated Apr. 3-7, 2017, 8 pages.
PCT International Search Report and Written Opinion in International Application No. PCT/KR2018/005140, dated Aug. 10, 2018, 24 pages (with English translation).
ZTE, ZTE Microelectronics, "Discussion on uplink DMRS design," R1-1704412, 3GPP TSG RAN WG1 Meeting #88bis, Spokane, USA, dated Apr. 3-7, 2017, 9 pages.
Nokia, Alcatel-Lucent Shanghai Bell, "On the design of short PUCCH for NR," R1-1705232, 3GPP TSG RAN WG1#88bis, Spokane, WA, USA, Apr. 3-7, 2017, 8 pages.
EP Supplementary European Search Report in European Appln. No. 187938782, dated Nov. 26, 2020, 11 pages.

\* cited by examiner

METHOD BY WHICH TERMINAL AND BASE STATION TRANSMIT/RECEIVE SIGNAL IN WIRELESS COMMUNICATION SYSTEM, AND DEVICE FOR SUPPORTING SAME

CROSS-REFERENCE TO RELATED APPLICATIONS

This application is a National Stage application under 35 U.S.C. § 371 of International Application No. PCT/KR2018/005140, filed on May 3, 2018, which claims the benefit of U.S. Provisional Application No. 62/566,340, filed on Sep. 30, 2017, U.S. Provisional Application No. 62/544,230, filed on Aug. 11, 2017, U.S. Provisional Application No. 62/543,955, filed on Aug. 10, 2017, U.S. Provisional Application No. 62/520,522, filed on Jun. 15, 2017, U.S. Provisional Application No. 62/506,518, filed on May 15, 2017, and U.S. Provisional Application No. 62/501,056, filed on May 3, 2017. The disclosures of the prior applications are incorporated by reference in their entirety.

TECHNICAL FIELD

The following description relates to wireless communication systems and, more particularly, to a method of transmitting and receiving signals between a user equipment and a base station in a wireless communication system and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems may include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system, and so on.

DETAILED DESCRIPTION OF THE INVENTION

Technical Problems

The present disclosure aims to provide a short-Physical Uplink Control Channel (short-PUCCH) structure considering at least one of transmit diversity, multiplexing between a plurality of short-PUCCHs, or multiplexing between a short-PUCCH and a Sounding Reference Signal (SRS), when a user equipment transmits uplink control information through a short-PUCCH including a relatively small number of symbols.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method of transmitting and receiving signals between a user equipment and a base station in a wireless communication system and an apparatus supporting the same.

According to an aspect of the present disclosure, provided herein is a method of transmitting a signal by a User Equipment (UE) to a Base Station (BS) in a wireless communication system, including allocating resources for transmitting a Physical Uplink Control Channel (PUCCH) composed of two or less symbols to a plurality of antenna ports, and transmitting the PUCCH to the BS through the plural antenna ports, wherein the resources allocated to the plural antenna ports are multiplexed.

When the PUCCH is composed of two symbols, resources for transmitting the two symbols may be allocated to each of the plural antenna ports and the same Uplink Control Information (UCI) may be transmitted through each of the plural antenna ports.

The UCI transmitted through each of the plural antenna ports may be repeatedly transmitted on two symbols allocated to each of the plural antenna ports or may be dividedly transmitted in the two symbols.

When the PUCCH is composed of two symbols, resources for transmitting the two symbols may be dividedly allocated to the plural antenna ports and the same Uplink Control Information (UCI) may be transmitted on a resource allocated to each of the plural antenna ports.

Demodulation Reference Signals (DM-RSs) corresponding to the respective antenna ports may be multiplexed according to a Code Division Multiplexing (CDM), Frequency Division Multiplexing (FDM), or Time Division Multiplexing (TDM) scheme.

When the DM-RSs corresponding to the respective antenna ports are multiplexed according to the CDM scheme, the DM-RSs corresponding to the respective antenna ports may be multiplexed by applying different Cyclic Shifts (CSs), different Frequency-Domain Orthogonal Cover Codes (FD-OCCs), or different Time-Domain Orthogonal Cover Codes (TD-OCCs).

A transmit diversity scheme may be differently applied based on whether frequency hopping is applied to the two or less symbols constituting the PUCCH.

The PUCCH may have a first PUCCH structure or a second PUCCH structure, the first PUCCH structure may be a structure based on a sequence selected based on Uplink Control Information (UCI) transmitted through the PUCCH from among a plurality of sequences allocated by the BS, and the second PUCCH structure may be a structure multiplexed by a resource for transmitting the UCI and a resource for transmitting a Reference Signal (RS) according to a Frequency Division Multiplexing (FDM) scheme.

When the PUCCH is a PUCCH composed of two symbols with the first PUCCH structure, a transmit diversity scheme may be differently applied based on whether frequency hopping is applied to the two symbols. When the frequency hopping is applied, a Spatial Orthogonal Resource Transmit Diversity (SORTD) scheme may be applied as the transmit diversity scheme. When the frequency hopping is not applied, the SORTD scheme or a Space Time Block Coding (STBC) scheme may be selectively applied as the transmit diversity scheme.

When the PUCCH is a PUCCH composed of two symbols with the second PUCCH structure, the transmit diversity scheme may be differently applied based on whether frequency hopping is applied to the two symbols. When the frequency hopping is applied, a Space Frequency Block Coding (SFBC) scheme may be applied as the transmit diversity scheme. When the frequency hopping is not applied, the SFBC scheme or the STBC scheme may be selectively applied as the transmit diversity scheme.

In another aspect of the present disclosure, provided herein is a method of receiving a signal by a Base Station (BS) from a User Equipment (UE) in a wireless communication system, including allocating resources for transmitting a Physical Uplink Control Channel (PUCCH) to the UE, and receiving the PUCCH through a plurality of antenna ports of the UE based on the allocated resources, wherein the PUCCH is composed of two or less symbols, the resources for transmitting the PUCCH are allocated to the plural antenna ports, and the resources allocated to the plural antenna ports are multiplexed.

In another aspect of the present disclosure, provided herein is a User Equipment (UE) for transmitting a signal to a Base Station (BS) in a wireless communication system, including a transceiver and a processor, wherein the processor allocates resources for transmitting a Physical Uplink Control Channel (PUCCH) composed of two or less symbols to a plurality of antenna ports and controls the transceiver to transmit the PUCCH to the BS through the plural antenna ports, and wherein the resources allocated to the plural antenna ports are multiplexed.

In another aspect of the present disclosure, provided herein is a Base Station (BS) for receiving a signal from a User Equipment (UE) in a wireless communication system, including a transceiver and a processor, wherein the processor allocates resources for transmitting a Physical Uplink Control Channel (PUCCH) to the UE and controls the transceiver to receive the PUCCH through a plurality of antenna ports of the UE based on the allocated resources, the PUCCH is composed of two or less symbols, the resources for transmitting the PUCCH are allocated to the plural antenna ports, and the resources allocated to the plural antenna ports are multiplexed.

It will be appreciated that the above-described embodiments in accordance with the present disclosure are a part of the preferred embodiments of the present disclosure, and various embodiments including the technical features of the present disclosure can be derived by a person skilled in the art based on the following detailed description of the present disclosure.

Advantageous Effects

According to various embodiments of the present disclosure, a PUCCH structure may support multiplexing between a plurality of PUCCHs transmitted through a plurality of antenna ports.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE INVENTION

Figure 1:
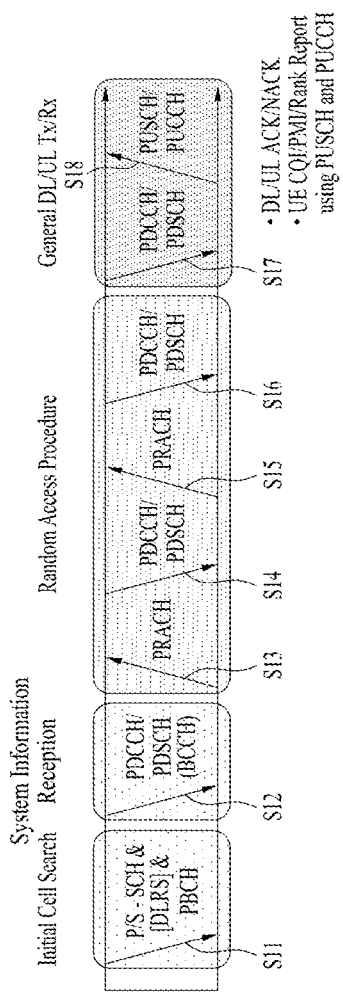
FIG. 1 illustrates physical channels and a signal transmission procedure using the physical channels according to an embodiment.

The embodiments of the present disclosure described below are combinations of elements and features of the present disclosure in specific forms. The elements or features may be considered selective unless otherwise mentioned. Each element or feature may be implemented without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). ABS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a User Equipment (UE), a Mobile Station (MS), a Subscriber Station (SS), a Mobile Subscriber Station (MSS), a mobile terminal, an Advanced Mobile Station (AMS), etc.

A transmission end may be a fixed and/or mobile node that provides a data service or a voice service, and a reception end may be a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G New Radio (NR) system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from a base station in downlink and transmits information to the base station in uplink. The information transmitted and received between the UE and the base station includes general data information and various types of control information. There are many physical channels according to the types/usages of information transmitted and received between the base station and the UE.

FIG. 1 illustrates physical channels and a signal transmission procedure using the physical channels according to an embodiment.

When a UE is powered on or enters a new cell, the UE performs initial cell search (S11). The initial cell search involves acquisition of synchronization to a base station. Specifically, the UE synchronizes its timing to the base station and obtains information such as a cell Identifier (ID) by receiving a Primary Synchronization Channel (P-SCH) and a Secondary Synchronization Channel (S-SCH) from the base station.

Then the UE may obtain information broadcast in the cell by receiving a Physical Broadcast Channel (PBCH) from the base station.

During the initial cell search, the UE may monitor a DL channel state by receiving a Downlink Reference Signal (DL RS).

After the initial cell search, the UE may obtain more detailed system information by receiving a Physical Downlink Control Channel (PDCCH) and receiving a Physical Downlink Shared Channel (PDSCH) based on information of the PDCCH (S12).

After obtaining more detailed system information, to complete connection to the base station, the UE may perform a random access procedure with the base station (S13 to S16). For example, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the base station (S17) and transmit a Physical Uplink Shared Channel (PUSCH) and/or a Physical Uplink Control Channel (PUCCH) to the base station (S18), in a general UL/DL signal transmission procedure.

Control information that the UE transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
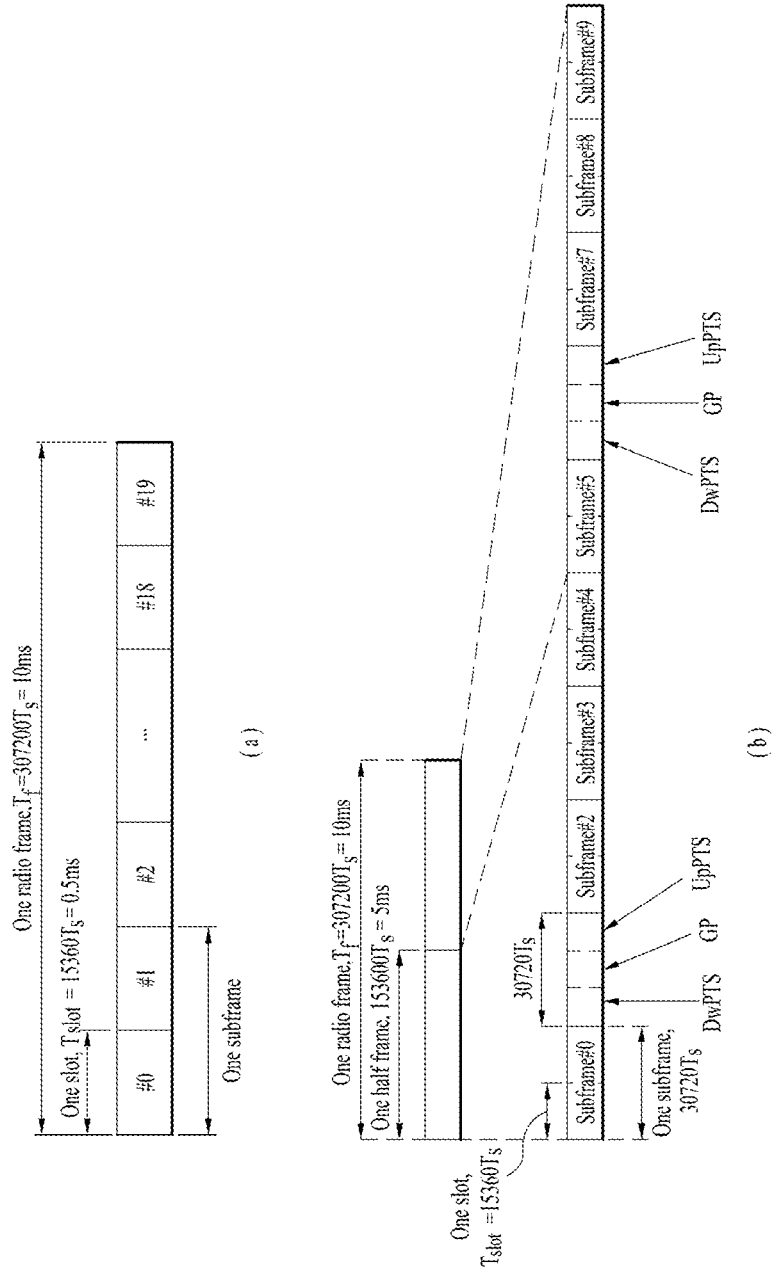
FIG. 2 illustrates exemplary radio frame structures according to an embodiment.

FIG. 2 illustrates exemplary radio frame structures according to an embodiment.

FIG. 2(a) illustrates frame structure type 1. Frame structure type 1 is applicable to both a full duplex Frequency Division Duplex (FDD) system and a half duplex FDD system.

One radio frame may be $T_f=307200*T_s=10$ ms long, including equal-sized 20 slots indexed from 0 to 19. Each slot is $T_{slot}=15360*T_s=0.5$ ms long. One subframe includes two successive slots. An ith subframe may include 2ith and (2i+1)th slots. That is, a radio frame may include 10 subframes. A time required for transmitting one subframe is defined as a Transmission Time Interval (TTI). Ts is a sampling time given as $T_s=1/(15\ kHz*2048)=3.2552*10^{-8}$ (about 33 ns). One slot may include a plurality of Orthogonal Frequency Division Multiplexing (OFDM) symbols or SC-FDMA symbols in the time domain and may include a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full duplex FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half duplex FDD system.

The above-described radio frame structure is purely exemplary. Thus, the number of subframes in a radio frame, the number of slots in a subframe, and the number of OFDM symbols in a slot may be changed in various manners.

FIG. 2(b) illustrates frame structure type 2. Frame structure type 2 is applied to a Time Division Duplex (TDD) system. One radio frame is $T_f=307200*T_s=10$ ms long, including two half-frames each having a length of $153600*T_s=5$ ms long. Each half-frame includes five subframes each being $30720*T_s=1$ ms long. An ith subframe includes 2ith and (2i+1)th slots each having a length of $T_{slot}=15360*T_s=0.5$ ms. Ts is a sampling time given as $T_s=1/(15\ kHz*2048)=3.2552*10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at a base station. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In addition, in the LTE Release 13 system, configurations configured in consideration of X as illustrated in the following Table 2 was introduced to the special subframe configurations. In the LTE Release14 system, specific subframe configuration #10 was newly added. Here, X represents the number of additional SC-FDMA symbols, and may be provided by the higher layer parameter named "srs-UpPtsAdd". If this parameter is not configured, X is set equal to 0. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.

used as a data region to which a PDSCH is allocated. Downlink control channels defined for the 3GPP LTE system may include a Physical Control Format Indicator Channel (PCFICH), a PDCCH, and a Physical Hybrid ARQ Indicator Channel (PHICH), and so on, to which the present disclosure is not limited.

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group, to which the present disclosure is not limited.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot$ | $(1 + X) \cdot$ | $7680 \cdot T_s$ | $(1 + X) \cdot$ | $(1 + X) \cdot$ |
| 1 | $19760 \cdot T_s$ | $2192 \cdot T_s$ | $2560 \cdot T_s$ | $20480 \cdot T_s$ | $2192 \cdot T_s$ | $2560 \cdot T_s$ |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot$ | $(2 + X) \cdot$ |
| 5 | $6592 \cdot T_s$ | $(2 + X) \cdot$ | $(2 + X) \cdot$ | $20480 \cdot T_s$ | $2192 \cdot T_s$ | $2560 \cdot T_s$ |
| 6 | $19760 \cdot T_s$ | $2192 \cdot T_s$ | $2560 \cdot T_s$ | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
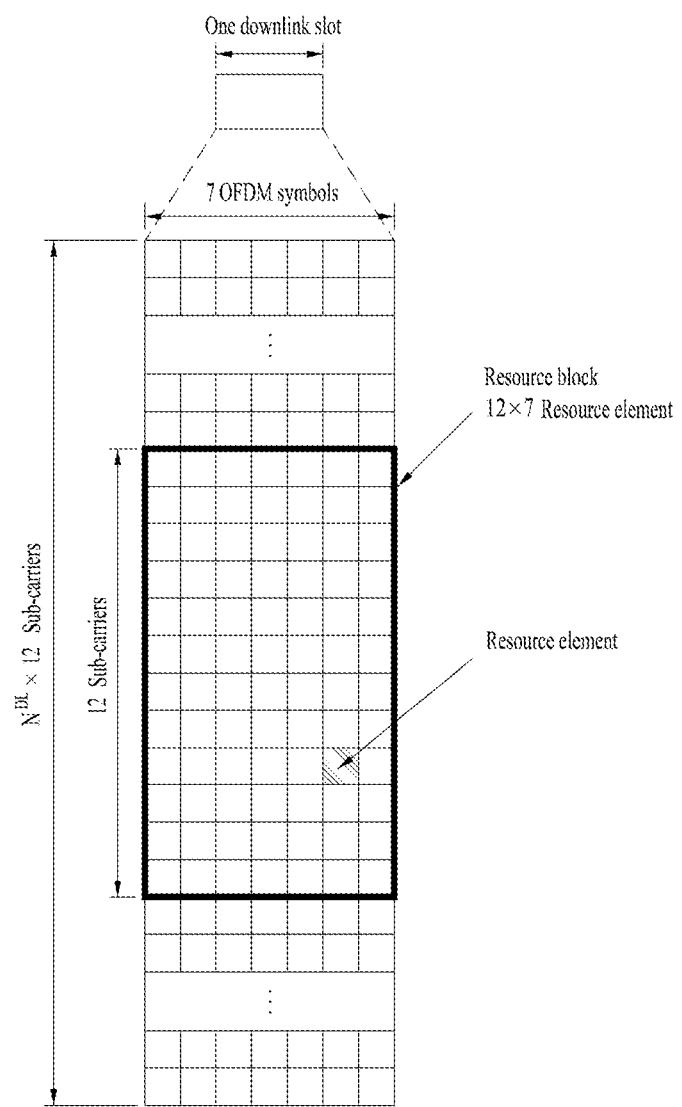
FIG. 3 illustrates a resource grid for a downlink slot according to an embodiment.

FIG. 3 illustrates a resource grid for a downlink slot according to an embodiment.

Referring to FIG. 3, one downlink slot may include a plurality of OFDM symbols in the time domain. For example, one downlink slot may include 7 OFDM symbols in the time domain and one resource block may include 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
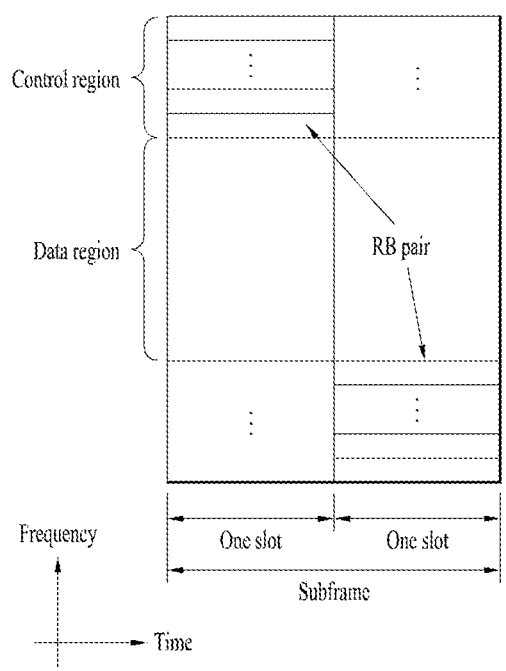
FIG. 4 illustrates a structure of a downlink subframe according to an embodiment.

FIG. 4 illustrates a structure of an uplink subframe according to an embodiment.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
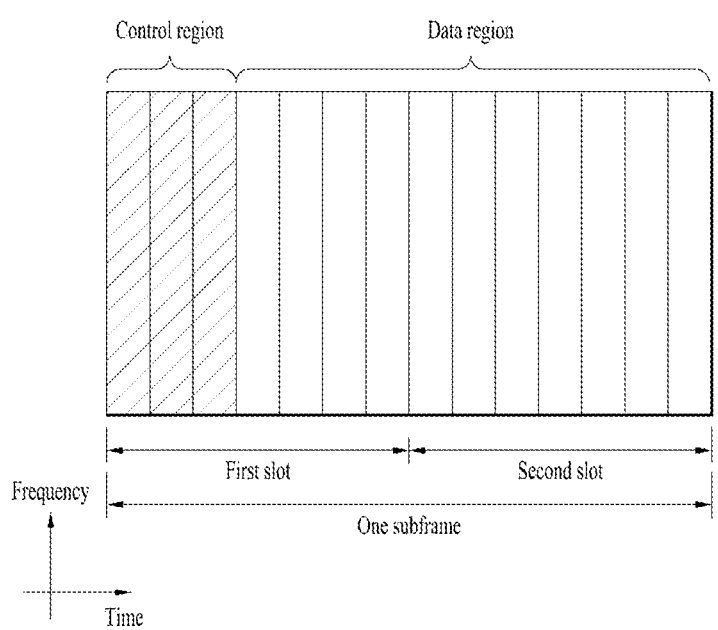
FIG. 5 illustrates a structure of an uplink subframe according to an embodiment.

FIG. 5 illustrates a structure of a downlink subframe according to an embodiment.

Referring to FIG. 5, up to three OFDM symbols from OFDM symbol index 0 to in the first slot within a subframe, are used as a control region to which control channels are allocated and the other OFDM symbols of the subframe are 2. New Radio Access Technology System As a number of communication devices have required higher communication capacity, the necessity for the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

The new radio access technology system has been proposed by considering the enhanced mobile broadband communication, massive MTC, Ultra-reliable and low latency communication (URLLC), etc. In the present disclosure, the corresponding technology is referred to as the new RAT or new radio (NR) for convenience of description.

2.1. Numerologies

The NR system to which the present disclosure is applicable supports various OFDM numerologies as shown in the following table. In this case, the value of μ and cyclic prefix information per carrier bandwidth part may be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

For DL and UL transmission, a frame may be configured to have a length of 10 ms. Each frame may be composed of ten subframes, each having a length of 1 ms. In this case, the number of consecutive OFDM symbols in each subframe is defined as $$N_{symb}^{subframe,\mu} = N_{symb}^{slot} N_{slot}^{subframe,\mu}.$$

Each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined based on the cyclic prefix as shown in the following table. The start slot ($n_s^\mu$) of one subframe is aligned with the start OFDM symbol ($n_s^\mu N_{symb}^{slot}$) of the same subframe in the time dimension.

Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 401 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

2.3 Self-Contained Subframe Structure

Figure 6:
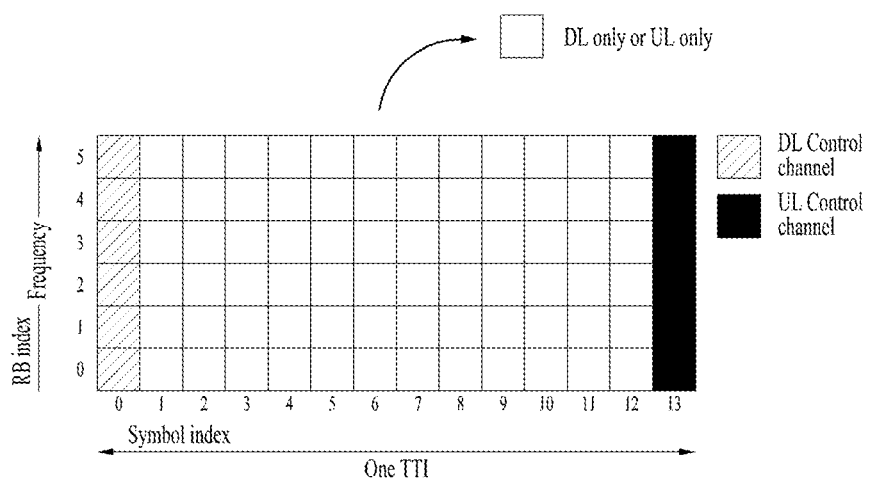
FIG. 6 is a diagram illustrating a frame structure of New Radio Access Technology (RAT) system according to an embodiment.

FIG. 6 is a diagram illustrating a frame structure of an NR system according to an embodiment.

In fifth generation (5G) NR, a subframe structure in which a control channel and a data channel are multiplexed according to Time-Division Multiplexing (TDM) may be considered in order to minimize latency.

Referring to FIG. 6, an area marked with slanted lines represents a DL control region and an area marked with black represents a UL control region. An area except for the slanted area and the black area may be used to transmit DL data or UL data. According to this structure, DL transmission and UL transmission may be sequentially performed in one subframe so that DL data is transmitted and ACK/NACK for UL may be received in the subframe. Accordingly, when a data transmission error occurs, the time taken to retransmit data may be reduced, thereby minimizing the latency of final data transmission.

In the subframe structure illustrated in FIG. 6, a time gap is needed to switch from a transmission mode to a reception mode or from the reception mode to the transmission mode of an eNB and a UE. Therefore, some OFDM symbols at the time of switching from DL to UL in one subframe may be configured as a guard period (GP).

2.4 Analog Beamforming

In a millimeter wave (mmW) band, the wavelength is shortened and thus a plurality of antennas may be installed in the same area. For example, a total of 100 antenna elements may be installed in a 5-by-5 cm panel in a 30 GHz band with a wavelength of about 1 cm in a 2-dimensional array at intervals of 0.5 lambda (wavelength). Therefore, in mmW, increasing coverage or throughput by increasing beamforming gain using multiple antenna elements is taken into consideration.

If a Transceiver Unit (TXRU) is provided to enable transmit power control and phase control per antenna element, independent beamforming per frequency resource is possible. However, installation of TXRUs in all of the about 100 antenna elements is less feasible in terms of cost. Therefore, a method of mapping a plurality of antenna elements to one TXRU and controlling the direction of a beam by an analog phase shifter may be considered. However, this analog beamforming scheme may generate only one beam direction in the whole band and, thus, may not perform frequency selective beamforming, which is disadvantageous.

As an intermediate form of digital beamforming and analog beamforming, hybrid beamforming with B TXRUs that are fewer than Q antenna elements may be considered. In hybrid beamforming, the number of beam directions in which beams may be transmitted at the same time is limited to B or less, which depends on how B TXRUs and Q antenna elements are connected.

When a plurality of antennas is used in the NR system, the hybrid beamforming scheme obtained by combining digital beamforming and analog beamforming has been used. In this case, analog (or Radio Frequency (RF)) beamforming means operation of performing precoding (or combining) at an RF unit. In the hybrid beamforming scheme, precoding (or combining) may be performed at a baseband unit and the RF unit. Thus, the hybrid beamforming scheme advantageously guarantees performance similar to the digital beamforming scheme while reducing the number of RF chains and Digital-to-Analog (D/A) (or Analog-to-Digital (A/D)) converters.

For example, the hybrid beamforming structure may be represented by N TXRUs and M physical antennas. In this case, digital beamforming for L data layers to be transmitted by a transmitting end may be represented by an N×L matrix. Thereafter, N converted digital signals are converted into analog signals by the TXRUs and then analog beamforming, which may be represented by the M×N matrix, is applied to the converted signals.

Figure 7:
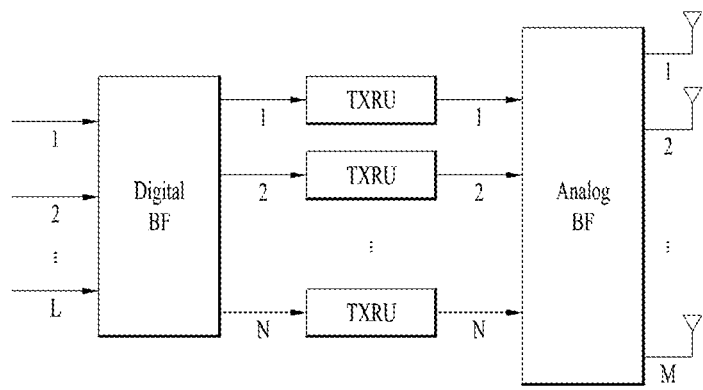
FIG. 7 is a diagram illustrating a hybrid beamforming structure according to an embodiment.

FIG. 7 is a diagram illustrating a hybrid beamforming structure according to an embodiment.

Referring to FIG. 7, the number of digital beams is L and the number of analog beams is N. In the NR system, a method for providing efficient beamforming to UEs located in a specific area by designing analog beamforming on a symbol basis by an eNB has been considered. Further, as illustrated in FIG. 7, a method of introducing a plurality of antenna panels capable of applying independent hybrid beamforming by defining N TXRUs and M RF antennas as one antenna panel has been considered in the NR system.

Figure 8:
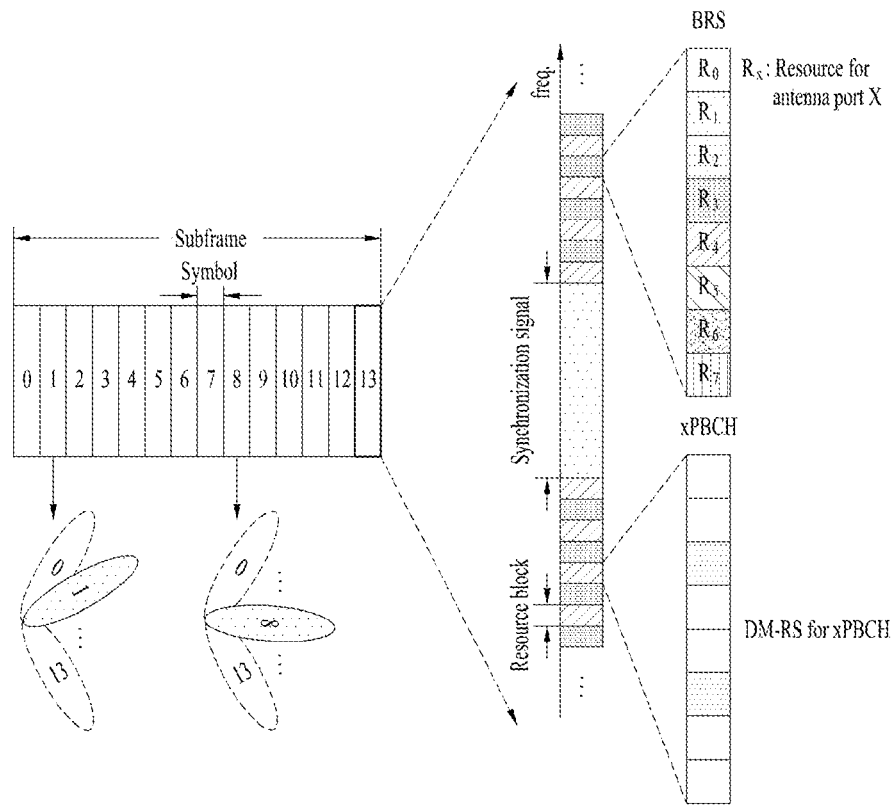
FIG. 8 is a diagram illustrating a Beam Reference Signal (BRS) according to an embodiment.

FIG. 8 is a diagram illustrating a beam sweeping operation for synchronization signals and system information during a DL transmission process according to an embodiment.

As described above, when the eNB uses a plurality of analog beams, an analog beam favorable for signal reception may differ according to each UE. Therefore, a beam sweeping operation is considered so that, for at least a synchronization signal, system information, and paging, all UEs may have reception opportunities by changing a plurality of analog beams to be applied by the eNB according to symbols in a specific subframe.

Referring to FIG. 8, a physical resource (or a physical channel) for broadcasting system information of the NR system may be referred to as a Physical Broadcast Channel (xPBCH). In this case, analog beams belonging to different antenna panels may be simultaneously transmitted in one symbol. In addition, as illustrated in FIG. 8, the introduction of a Beam Reference Signal (BRS) corresponding to a Reference Signal (RS) to which a single analog beam is applied has been discussed in order to measure a channel according to an analog beam. In this case, a single analog beam may imply a beam corresponding to a specific antenna panel. The BRS may be defined for a plurality of antenna ports and each antenna port of the BRS may correspond to a single analog beam. In this case, unlike the BRS, all analog beams in an analog beam group may be applied to the synchronization signal or xPBCH unlike the BRS to assist a random UE to correctly receive the synchronization signal or xPBCH.

2.5 Radio Resource Management (RRM) Measurement in LTE

An LTE system supports an RRM operation including power control, scheduling, cell search, cell reselection, handover, radio link or connection monitoring, and connection establishment and re-establishment. In this case, a serving cell may request the UE to send RRM measurement information corresponding to a measurement value for performing the RRM operation. For example, in the LTE system, the UE may measure cell search information, Reference Signal Received Power (RSRP), Reference Signal Received Quality (RSRQ), and the like for each cell and then report the measured information. Specifically, in the LTE system, the UE may receive 'measConfig' as a higher layer signal for RRM measurement from the serving cell and then measure RSRP or RSRQ according to the received information of 'measConfig'. The definition of the RSRP and the RSRQ of the LTE system according to the standard document of TS 36.214 is represented in Table 6 below.

TABLE 6

| [RSRP] |
| --- |
| Reference signal received power (RSRP), is definded as the linear average over the power contributions (in [W]) of the resource elements that carry cell-specific reference signals within the considered measurement frequency bandwidth. For RSRP determination the cell-specific reference signals R0 according TS 36.211 shall be used. If the UE can reliably detect that R1 is available it may use R1 in addition to R0 to determine RSRP.<br>The reference point the RSRP shall be the antenna connector of the UE.<br>If receiver diversity is in use by the UE, the reported value shall not be lower than the corresponding RSRP of any of the individual diversity branches. |
| [RSRQ] |
| Reference Signal Received Quality (RSRQ) is defined as the ratio NxRSRP/E-UTRA carrier RSSI), where N is the number of RB's of the E-UTRA carrier RSSI measurement bandwidth. The measurements in the numerator and denominator shall be made over the same set of resource blocks.<br>E-UTRA Carrier Received Signal Strength Indicator (RSSI), comprises the linear average of the total received power (in [W]) observed only in OFDM symbols containing reference symbols for antenna port 0, in the measurement bandwidth over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.<br>The reference point for the RSRQ shall be theantenna connector of the UE.<br>If receiver diversity is in use by the UE, the reported value shall not be lower than the corresponding RSRQ of any of the individual diversity branches. |
| [RSSI] |
| The received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall not be lower than the corresponding UTRA carrier RSSI of any of the individual receive antenna branches. |

According to definition based on Table 6, the UE operating in the LTE system may measure the RSRP through an allowed measurement bandwidth related Information Element (IE) transmitted in System Information Block type 3 (SIB3) in the case of intra-frequency measurement. In the case of inter-frequency measurement, the UE may measure the RSRP through the allowed measurement bandwidth related IE transmitted in SIB5. In this case, the UE may measure the RSRP in bandwidth corresponding to one of 6, 15, 25, 50, 75, and 100 RBs. When there is no IE, the UE may measure the RSRP in the entire DL system frequency band. Upon receiving information about the allowed measurement bandwidth, the UE may consider the corresponding value as a maximum measurement bandwidth and then freely measure the RSRP value in the corresponding value. However, if the service cell transmits an IE defined as WideBand (WB)-RSRQ to the UE and sets the allowed measurement bandwidth equal to or higher than 50 RBs, the UE should calculate the RSRP value for the entire allowed measurement bandwidth. Meanwhile, for a Received Signal Strength Indicator (RSSI), the UE measures the RSSI in a frequency band of a receiver of the UE according to the definition of RSSI bandwidth.

3. Proposed Embodiments

Hereinafter, a configuration proposed in the present disclosure will be described based on the above-described technical idea and scope.

The present disclosure proposes a PUCCH structure considering at least one of a Transmit Diversity (TxD) scheme, multiplexing between a plurality of PUCCHs, and multiplexing between a PUCCH and a Sounding Reference Signal (SRS), when a UE transmits UCI on a PUCCH composed of a small number of symbols in a wireless communication system.

Recently, the 3GPP standardization organization is considering network slicing to achieve a plurality of logical networks in a single physical network in an NR system, which is a 5G wireless communication system. The logical networks should be capable of supporting various services (e.g., enhanced mobile broadband (eMBB), massive Machine Type Communication (mMTC), Ultra-Reliable and Low-Latency Communication (URLLC), etc.) having various requirements. A physical layer system of the NR system is considering a method supporting an Orthogonal Frequency Division Multiplexing (OFDM) scheme using variable numerologies according to the various services. In other words, the NR system may consider the OFDM scheme (or multiple access scheme) having independent numerologies in respective time and frequency resource regions.

A basic time unit for data scheduling in the NR system may be defined as a slot composed of a plurality of OFDM symbols. To reduce latency caused by HARQ-ACK (or decoding result) transmission in the slot, a method is discussed in which a PUCCH, which is a physical channel for transmitting a UL control signal, is multiplexed with a data channel by TDM and the multiplexed channels are transmitted within a relatively short time duration, as illustrated in FIG. 6. Hereinbelow, for convenience of description, a PUCCH transmitted in a short time duration corresponding to a few (e.g., one or two) OFDM symbols in the slot is referred to as a short-PUCCH. For example, the short-PUCCH may have length corresponding to one or two OFDM symbols. For example, the UE may determine HARQ-ACK (or decoding result) of DL data in the same slot and transmit information about the HARQ-ACK (or decoding result) to an eNB through the short-PUCCH on rear OFDM symbols of the same slot.

For example, when there is a small amount of UCI (e.g., one bit or two bits) transmitted through the short-PUCCH, the eNB may allocate a sequence set composed of a plurality of sequences to the UE as a short-PUCCH resource and the UE may selectively transmit a specific sequence corresponding to UCI to be transmitted from among the plural sequences allocated as the short-PUCCH resource. In this case, the sequence may be designed to satisfy a low Peak-to-Average Power Ratio (PAPR) property. Hereinbelow, for convenience of description, the above-described sequence-based short-PUCCH structure will be referred to as a SEQ-PUCCH.

When there is a large amount of UCI (e.g., 3 bits or more) transmitted through the short-PUCCH, the eNB may allocate a resource consisting of REs for UCI transmission and REs for RS transmission to the UE as the short-PUCCH resource. In this case, the REs for RS transmission and the REs for UCI transmission may be distinguished according to an FDM scheme per symbol.

The UE may generate coded bits for the UCI and then transmit modulated symbols for the generated coded bits on the REs for UCI transmission. Hereinafter, for convenience of description, a short-PUCCH structure to which the FDM scheme (per symbol) between the RS and the UCI is applied will be referred to as an FDM-PUCCH.

Hereinbelow, the present disclosure proposes a short-PUCCH structure in terms of at least one of a TxD scheme, multiplexing between a plurality of PUCCHs, and multiplexing between an SRS and a PUCCH. Although operation in the NR system will be described hereinbelow for convenience of description, it is apparent that proposed methods of the present disclosure are applicable to a general wireless communication system.

In the present disclosure, an RE represents a resource corresponding to one symbol and one subcarrier in an OFDM scheme and an REG represents an RE group composed of a plurality of REs in one symbol. The REG may be composed of a plurality of consecutive REs on the frequency axis or may be composed of a plurality of consecutive REs on a specific comb resource on the frequency axis.

In the present disclosure, a Constant Amplitude Zero Auto-Correlation (CAZAC) sequence represents a sequence having a CAZAC characteristic and a Cyclic Shift (CS) represents a CS value applied on the time axis (or frequency axis).

In the present disclosure, an SRS represents an RS for measuring a UL channel.

3.1 Proposed Method #1: Method of Mapping an RS and UCI in an REG Based on a Specific Pattern when an FDM-PUCCH is Configured by the REG as a Basic Unit According to an embodiment, when the FDM-PUCCH is configured by the REG as the basic unit, the RS and the UCI in the REG may be mapped based on one of the following patterns. A pattern may vary with RS density. For example, the pattern may correspond to one of the following 4 cases. The RS and the UCI may be mapped based on one of the plural patterns configured for each case.

Case 1: RS density=½

Option 1: RURU or URUR

Option 2: RRUU or URRU or UURR (2) Case 2: RS density=⅓

Option 1: RRUUUU or URRUUU or UURUUR

Option 2: RRUUUU or URRUUU or UURRUU or UUURRU or UUUURR (3) Case 3: RS density=¼

Option 1: RUUURUUU or URUUURUU or UURUU-URU or UUURUUUR

Option 2: RUURUUUU or URRUUUUU or UURUU-RUU or UUURUURU or UUUURUUR

Option 3: RRUUUUUU or URRUUUUU or UURRU-UUU or UUURRUUU or UUUURRUU or UUUUURRU or UUUUUURR (4) Case 4: RS density=⅙

Option 1: RUUUUURUUUUU or URUUUUURUUUU or UURUUUUURUUU or UUURUUUUURUU or UUUU-RUUUUURU or UUUUURUUUUUR Option 2: RRUUUUUUUUUU or URRUUUUUUUUU or UURRUUUUUUUU or UUURRUUUUUUU or UUUURRUUUUUU or UUUUURRUUUUU or UUUUUURRUUUU or UUUUUUURRUUU or UUUUUUUURRUU or UUUUUUUUURRU or UUUUUUUUUURR.

In the above patterns, R may represent an RE for transmitting the RS and U may represent an RE for transmitting the UCI. When REs in an REG are plural consecutive REs on a specific comb resource, the above patterns may be applied to plural consecutive REs on the specific comb resource.

For example, when the FDM-PUCCH is configured by a plurality of REs within one symbol, a Space Frequency Block Code (SFBC) scheme, which is a type of Alamouti scheme, may be considered as a TxD scheme applicable to a 1-symbol PUCCH. To apply the SFBC scheme, REs for RS transmission should be paired and REs for UCI transmission should be paired. That is, the number of REs for RS transmission in the FDM-PUCCH should be an even number and the number of REs for UCI transmission in the FDM-PUCCH should also be an even number. The above-described patterns indicate minimum patterns that satisfy pairing between REs for RS transmission and paring between REs for UCI transmission according to RS density. Next, RS-to-UCI mapping in the REG constituting the FDM-PUCCH may be represented in the form of repeating the pattern. In this case, when the number of REs in the REG is N and the number of REs in the pattern is M, the FDM-PUCCH may be configured by K REGs corresponding to L, which is a least common multiple of N and M, as the basic unit. In this case, K may be a value satisfying L/N.

As an additional operation of Proposed Method #1, when the FDM-PUCCH is configured by the REG as the basic unit, the size of the REG may be determined such that the number of UCI coded bits is equal to or greater than a specific size with respect to a specific ratio of RS/UCI. The size of the REG may be represented as a multiple of an RB which is a resource allocation unit on the frequency axis and the RB is composed of Q REs on the frequency axis.

For example, when an RB is composed of 12 REs on the frequency axis, if UCI coded bits that the basic unit (or REG) constituting the FDM-PUCCH can transmit are 20 bits or more and a Quadrature Phase Shift Keying (QPSK) modulation scheme is applied, a minimum of 10 REs is needed to transmit the UCI. Therefore, when the ratio of RS:UCI is 1:2, two RBs (or 24 REs) may be the basic unit (or REG) constituting the FDM-PUCCH.

As another example, it may be assumed that an RB is composed of 12 REs on the frequency axis and the REG of the FDM-PUCCH is configured on a comb resource of an interval of two subcarriers. In this case, assuming that UCI coded bits that the basic unit (or REG) constituting the FDM-PUCCH can transmit are 20 bits or more and the QPSK modulation scheme is applied, a minimum of 10 REs is needed to transmit the UCI. If the ratio of RS:UCI is 1:2, three RBs (or 18 REs, i.e., 6 REs per RB) may be the basic unit (or REG) constituting the FDM-PUCCH.

As an additional operation of Proposed Method #1, the PUCCH (or FDM-PUCCH) may be configured as follows.

One RB may be composed of Y REs (e.g., Y=12).

If minimum required coded bits are X bits, minimum required UCI REs may be X/2 REs (e.g., X=20)

When the ratio of RS:UCI is 1:Z, a minimum of M RBs supporting X coded bits or more may be configured in units of a minimum PUCCH resource. For example, when Y=12 and X=20, (Z, M) may be (1,2), (2,2), (3,2), or (5,1).

One PUCCH (or FDM-PUCCH) may be composed of RBs corresponding to a multiple of M.

Proposed Method #1 described above may be applied together in combination with other proposed methods of the present disclosure unless Proposed Method #1 is contradictory to the other proposed methods.

3.2 Proposed Method #2: Method of Configuring a DM-RS in an REG Based on a CAZAC Sequence when an FDM-PUCCH is Configured by the REG as a Basic Unit When the FDM-PUCCH is configured by the REG as the basic unit, a method of configuring the DM-RS in the REG based on the CAZAC sequence (X[k], k=0, 1, . . . , N−1) may differ according to the number of antenna ports as follows.

(1) Case in which the Number of Antenna Ports is 1

A sequence obtained by applying a specific CS value to the CAZAC sequence may be allocated as the DM-RS. For example, the DM-RS sequence may be allocated as indicated in Equation 1.

$$\text{DM-RS (port 0)}: Y[k] = X[k] \times \exp(-2 \times \pi \times j \times n_0 \times k \times N),$$

$$k=0,1,\ldots,N-1, n_0 \in \{0,1,\ldots,N-1\} \qquad \text{[Equation 1]}$$

(2) Case in which the Number of Antenna Ports is M (M=2)—Method 1

A sequence obtained by applying the specific CS value to the CAZAC sequence may be allocated as the DM-RS. In this case, a different CS value may be applied according to an antenna port. For example, the DM-RS sequence may be allocated as indicated in Equation 2.

$$\text{port 0}: Y_0[k] = X[k] \times \exp(-2 \times \pi \times j \times n_0 \times k \times N), \qquad \text{[Equation 2]}$$
$$\text{port 1}: Y_1[k] = X[k] \times \exp(-2 \times \pi \times j \times n_1 \times k \times N)$$
$$\ldots$$
$$\text{port } M-1: Y_{M-1}[k] = X[k] \times \exp(-2 \times \pi \times j \times n_{M-1} \times k \times N),$$

In Equation 2, k, $n_0$, $n_1$, $n_2$, . . . , $n_{M-1}$ may satisfy Equation 3 indicated below.

$$k=0,1,\ldots,N-1$$

$$n_0, n_1, \ldots, n_{M-1} \in \{0,1,\ldots,N-1\}, n_0 \neq n_1 \neq n_2 \neq \ldots \neq n_{M-1} \qquad \text{[Equation 3]}$$

Herein, a DM-RS resource per antenna port may be multiplexed by a Code Division Multiplexing (CDM) scheme.

(3) Case in which the Number of Antenna Ports is M (M=2)—Method 2

A sequence obtained by down-sampling the CAZAC sequence based on a factor M may be allocated as the DM-RS. In this case, a starting point of down-sampling may be differently applied according to an antenna port. For example, the DM-RS sequence may be allocated as indicated by Equation 4.

$$\text{port 0}: Y_0[k] = X[M \times k + m_0], k = 0, \qquad \text{[Equation 4]}$$
$$1, \ldots, \frac{N}{M} - 1, m_0 \in \{0, 1, \ldots, M-1\}$$
$$\text{port 1}: Y_1[k] = X[M \times k + m_1], k = 0, 1,$$
$$\ldots, \frac{N}{M} - 1, m_1 \in \{0, 1, \ldots, M-1\}$$
$$\ldots$$
$$\text{port } M-1: Y_{M-1}[k] = X[M \times k + m_{M-1}],$$
$$k = 0, 1, \ldots, \frac{N}{M} - 1, m_{M-1} \in \{0, 1, \ldots, M-1\}$$
$$\text{where } m_0 \neq m_1 \neq m_2 \neq \cdots \neq m_{M-1}$$

In this case, a DM-RS resource per antenna port may be multiplexed by an FDM scheme. In addition, the CAZAC sequence used to configure the DM-RS in the REG may be allocated as a SEQ-PUCCH resource. That is, the DM-RS of the FDM-PUCCH and the sequence allocated to the SEQ-PUCCH may be multiplexed by the CDM scheme.

Figure 9:
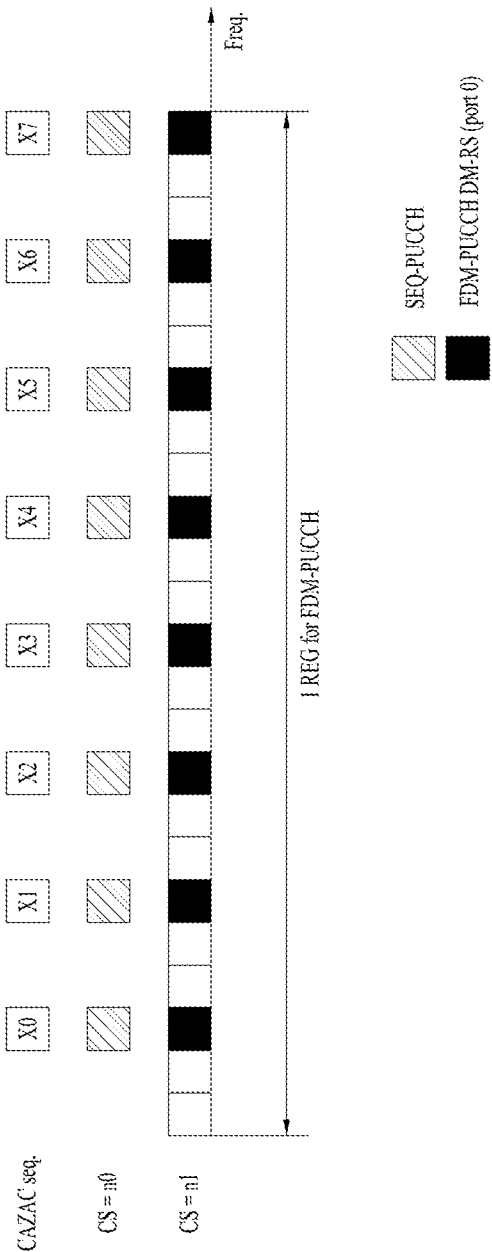
FIG. 9 is a diagram illustrating a Demodulation Reference Signal (DM-RS) in a Resource Element Group (REG) in the form of a comb resource according to an embodiment.

FIG. 9 is a diagram illustrating a DM-RS in an REG in the form of a comb resource according to an embodiment.

For example, an FDM-PUCCH may be configured by an REG including 24 consecutive REs on the frequency axis as a basic unit and DM-RS density in the FDM-PUCCH may be ⅓. In this case, the DM-RS in the REG may be represented in the form of a comb resource having an interval of three REs or as one interface resource in Interleaved Frequency Division Multiple Access (IFDMA) having a repetition factor of 3, as illustrated in FIG. 9.

In this case, a method of raising multiplexing capacity between short-PUCCHs by supporting a CDM scheme between the FDM-PUCCH DM-RS and the SEQ-PUCCH may be considered. A sequence capable of being allocated to the SEQ-PUCCH may be designed as the CAZAC sequence such as a Zadoff-Chu in order to satisfy a low PAPR characteristic. In addition, in order to support CDM between the SEQ-PUCCH and the FDM-PUCCH DM-RS, the DM-RS in the REG of the FDM-PUCCH may also be designed as the CAZAC sequence.

Figure 10:
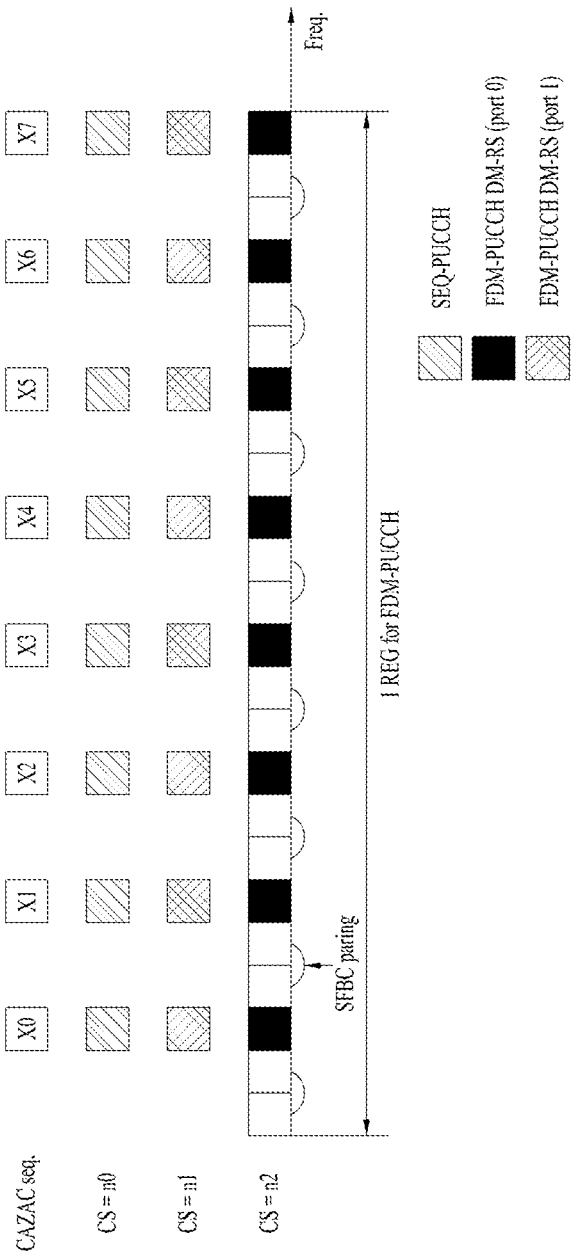
FIG. 10 is a diagram illustrating an example of applying a CAZAC sequence to which different CS values are applied to a DM-RS corresponding to a plurality of antenna ports.

FIG. 10 is a diagram illustrating a method of designing a DM-RS in an REG of an FDM-PUCCH based on a CAZAC sequence according to an embodiment.

For example, when the number of antenna ports in the FDM-PUCCH is one, the DM-RS in the REG of the FDM-PUCCH may be designed as a sequence obtained by applying a specific CS value to the CAZAC sequence used in the SEQ-PUCCH.

When the number of antenna ports in the FDM-PUCCH is 2, the DM-RS in the REG of the FDM-PUCCH may be designed based on the CAZAC sequence, as illustrated in FIG. 10. In this case, a CS value applied to the CAZAC sequence per antenna port may be differently set. In this case, the DM-RS in the REG may be transmitted by the CDM scheme with respect to two antenna ports and an SFBC scheme for applying SFBC pairing to REs for UCI transmission in the REG on the frequency axis may be supported.

Figure 11:
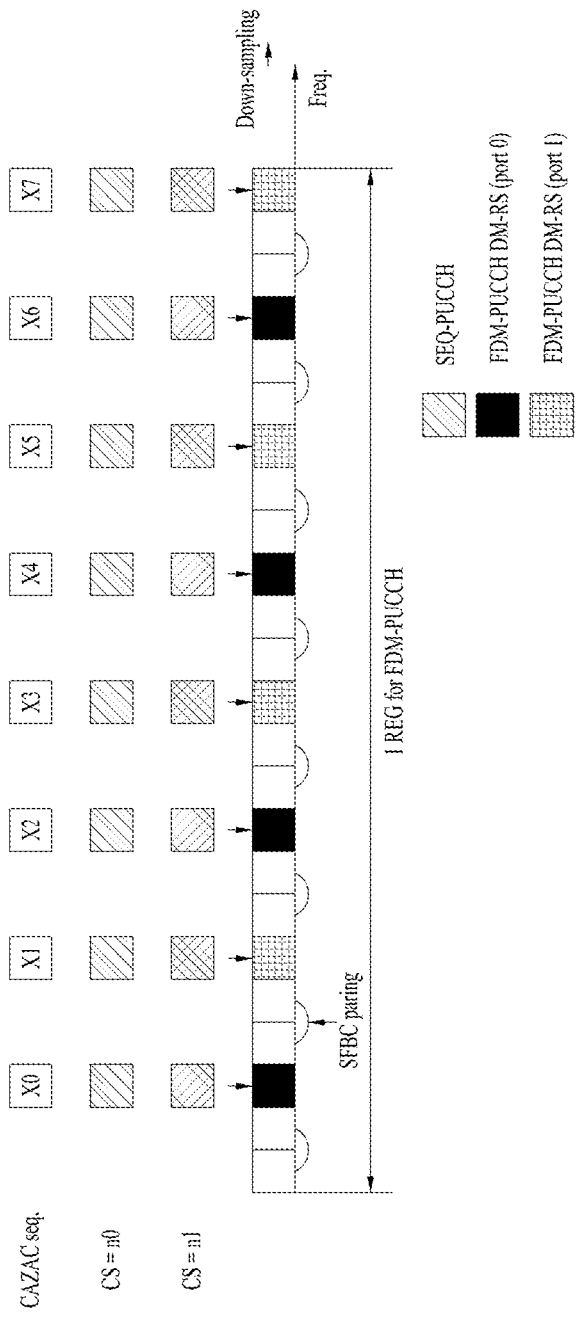
FIG. 11 is a diagram illustrating an example of applying a down-sampled CAZAC sequence to a DM-RS according to an embodiment.

FIG. 11 is a diagram illustrating a method of designing a DM-RS in an REG of an FDM-PUCCH based on a CAZAC sequence down-sampled by a factor 2 according to an embodiment.

According to an embodiment, when the number of antenna ports in the FDM-PUCCH is 2, the DM-RS in the REG of the FDM-PUCCH may be designed based on a factor-2 based down-sampled sequence of a specific CAZAC sequence, as illustrated in FIG. 11. For example, for antenna port 0, the sequence of the DM-RS may be configured by sampling only odd-numbered values of the CAZAC sequence and, for antenna port 1, the sequence of the DM-RS may be configured by sampling only even-numbered values of the CAZAC sequence. The sequence obtained by sampling only the odd-numbered values may be a sequence acquired by adding a sequence having a CS value of 0 and a sequence having a CS value of N, with respect to a length-2*N CAZAC sequence. The sequence obtained by sampling only the even-numbered values may be a sequence acquired by subtracting the sequence having the CS value of N from the sequence having the CS value of 0, with respect to the length-2*N CAZAC sequence. Therefore, the down-sampled sequence may still maintain a CDM characteristic with the length-2*N CAZAC sequence having CS values except for 0 and N.

Proposed Method #2 is more generalized as follows. A DM-RS (DM-RS A) for a specific physical channel may be a length-N CAZAC sequence and the CAZAC sequence may be mapped to a plurality of REs on the frequency axis. In this case, samples in the CAZAC sequence may have indexes of n=0, 1, . . . , N−1. Among resources of DM-RS A, RE resources to which a DM-RS (DM-RS B) for transmitting a specific physical channel is mapped may be configured by RE resources to which sequence samples corresponding to (M*n+k) indexes (herein, n=0, 1, 2, . . . , N/M−1, k∈{0, 1, . . . M−1}) in the CAZAC sequence are mapped. In this case, a sequence sample value for DM-RS B in each RE in DM-RS B may be configured equally to a sequence sample value of DM-RS A which is mapped at a corresponding RE location.

In addition, when a DM-RS (DM-RS A) for a specific physical channel is a CAZAC sequence of a length of N=L*M and the CAZAC sequence is mapped to a plurality of REs on the frequency axis, a DM-RS (DM-RS B) for transmitting a specific physical channel may be configured by a linear combination (e.g., sum) of sequences obtained by applying CS values 0, M, . . . , M*(L−1) (where k∈{0, 1, . . . , M−1}) to the CAZAC sequence. For example, during the linear combination, a weight applied to a sequence to which a CS value p (where p∈{0, M, . . . , M*(L−1)}) is applied may be configured as indicated by Equation 5.

$$\exp\left(+2\times\pi\times j\times p\times\frac{l}{N}\right) \text{ or } \exp\left(-2\times\pi\times j\times p\times\frac{l}{N}\right), \quad \text{[Equation 5]}$$

$$l \in \{0, 1, 2, \ldots L-1\}$$

Proposed Method #2 described above may be applied together in combination with other proposed methods of the present disclosure unless Proposed Method #2 is contradictory to the other proposed methods.

3.3 Proposed Method #3: Method of Designing an REG of an FDM PUCCH in the Form of a Comb Resource when the FDM-PUCCH is Configured by the REG as a Basic Unit According to an embodiment, when the FDM-PUCCH is configured by the REG as the basic unit, the REG of the FDM-PUCCH may be designed as a comb resource structure in which an interval of REs on the frequency axis is K subcarriers. In this case, a resource on which a SEQ-PUCCH (or SRS) is transmitted may also be a comb resource structure in which an interval of REs is K subcarriers. The SEQ-PUCCH (or SRS) and the FDM-PUCCH may be multiplexed by an IFDM scheme.

According to another embodiment, a method of using the comb resource structure may be considered to support multiplexing between the FDM-PUCCH and the SEQ-PUCCH, transmitted in the same symbol. For example, as illustrated in FIG. 12, the SEQ-PUCCH and the FDM-PUCCH may be distinguished on the frequency axis using an Interleaved Frequency-Division Multiple Access (IF-DMA) scheme having a repetition factor of 2.

Figure 12:
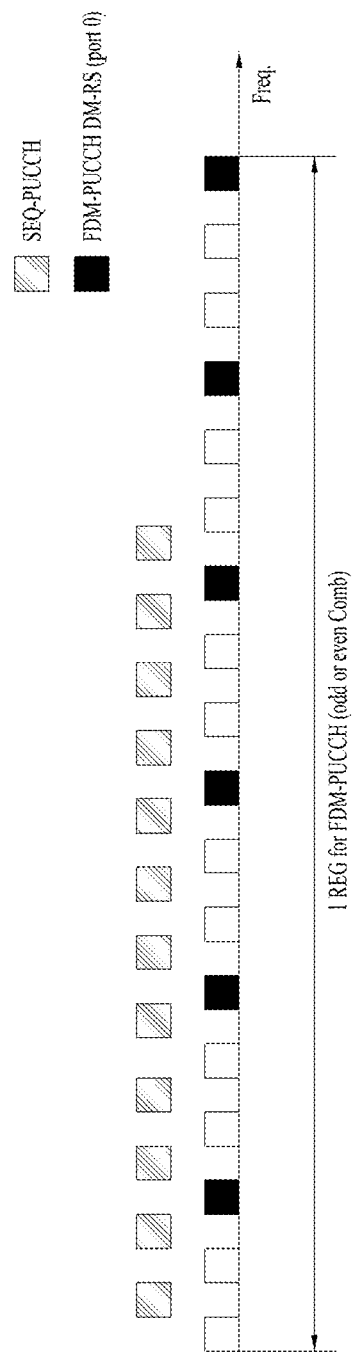
FIG. 12 is a diagram illustrating a Resource Element Group (REG) constituting a PUCCH of a second PUCCH structure according to an embodiment.

Referring to FIG. 12, one REG constituting the FDM-PUCCH may be composed of 18 consecutive REs in the form of a comb resource and RS density in the REG may be ⅓.

Referring to FIG. 12, when the number of REs on which the UCI in the REG is 12 and a QPSK modulation scheme is applied, 24-bit UCI may be transmitted based on coded bits. The 24-bit UCI based on the coded bits has a size similar to the size of coded bits supported by PUCCH format 2 in an LTE system and corresponds to a proper size that may include ACK/NACK (HARQ-ACK or decoding result) and Channel State Information (CSI) as UCI. As in the above-described method, when the SEQ-PUCCH (or SRS) and the FDM-PUCCH are distinguished in the form of the comb resource, there is an advantage of freely designing a sequence for each short-PUCCH or a DM-RS.

Figure 13:
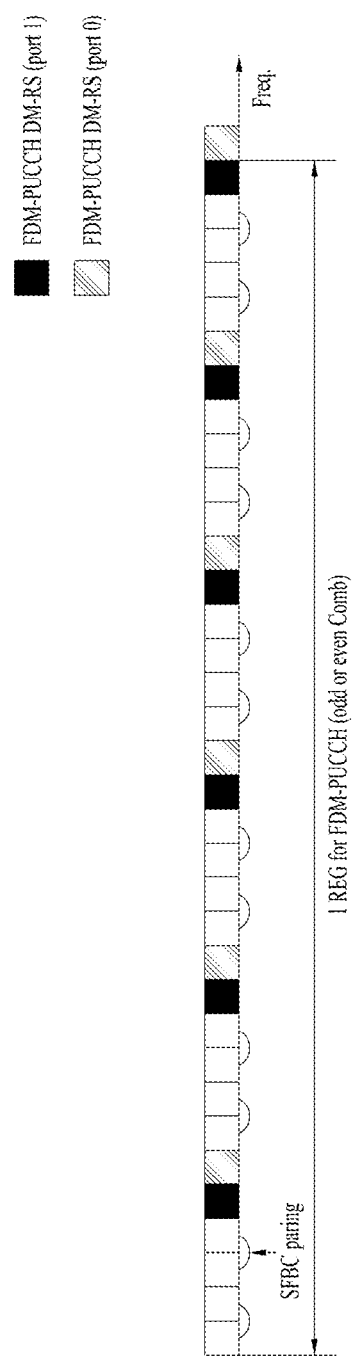
FIG. 13 is a diagram illustrating an example of applying SFBC pairing when two REGs constitute a PUCCH of a second PUCCH structure.

FIG. 13 is a diagram illustrating a method of applying multiplexing between DM-RS port 0 and DM-RS port 1 according to an embodiment.

As an additional operation of Proposed Method #3, when the FDM-PUCCH is configured by REGs and each REG is represented by a comb resource structure in which an interval of REs is K subcarriers and when all 2*N REGs constitute the FDM-PUCCH and N pairs satisfying an interval of REGs corresponding to K subcarriers or less on the frequency axis are present among the 2*N REGs, SFBC may be applied in units of the REG pair. For example, when one REG in another comb resource is added to the REG illustrated in FIG. 12 so that two REGs constitute the FDM-PUCCH, SFBC pairing may be applied as illustrated in FIG. 13.

Referring to FIG. 13, although a structure in which DM-RS port 0 and DM-RS port 1 are FDMed is illustrated, DM-RS port 0 and DM-RS port 1 may be multiplexed by applying an Orthogonal Cover Code (OCC) to two adjacent REs.

In addition, as an additional operation of Proposed Method #3, a sequence length when the SEQ-PUCCH uses a resource in an REG composed of consecutive REs may differ from a sequence length when the SEQ-PUCCH supports multiplexing with another PUCCH (e.g., FDM-PUCCH) in the form of a comb resource.

Proposed Method #3 described above may be applied together in combination with other proposed methods of the present disclosure unless Proposed Method #3 is contradictory to the other proposed methods.

3.4. Proposed Method #4: Method of Configuring an REG Based on a Specific Pattern in Consideration of Multiplexing with an SRS when an FDM-PUCCH is Configured by the REG as a Basic Unit FIG. 14 is a diagram illustrating an example of patterns used to configure an REG for an FDM-PUCCH.

Figure 14:
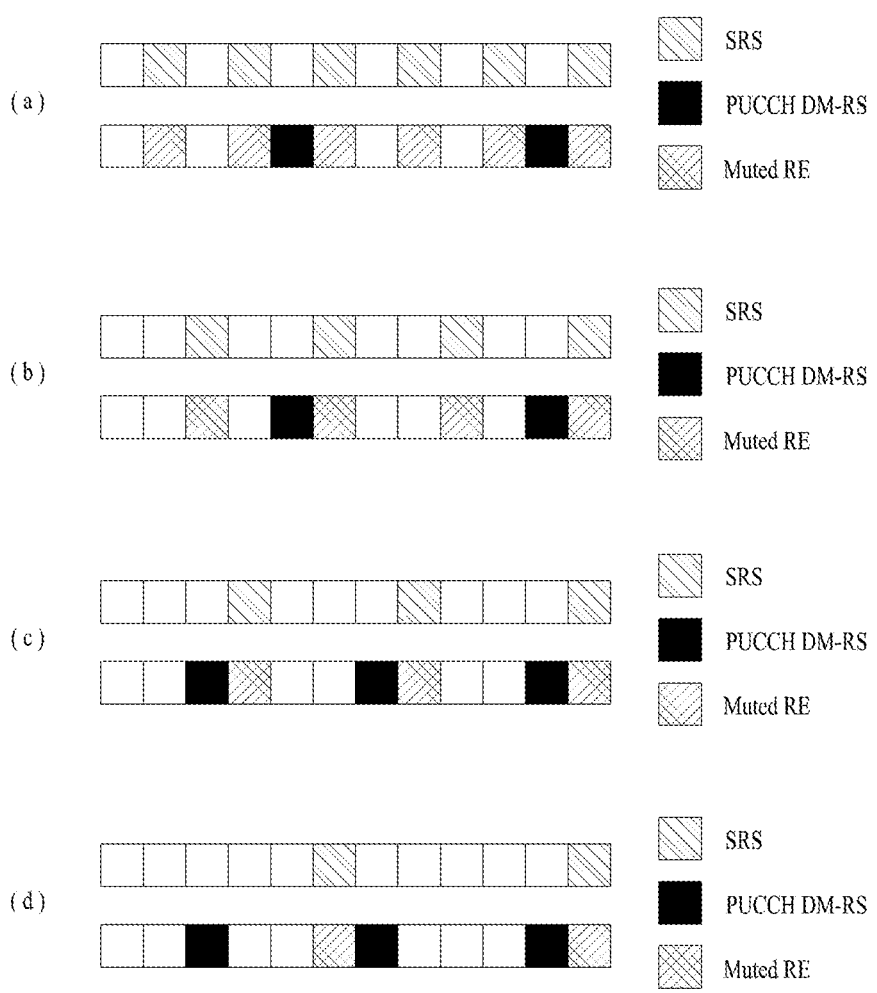
FIGS. 14(a) to 14(d) are diagrams illustrating examples of designing an REG constituting a PUCCH of a second PUCCH structure considering a Sounding Reference Signal (SRS).

According to an embodiment, the REG for the FDM-PUCCH may be configured based on one or more patterns among 4 patterns illustrated in FIG. 14 in consideration of multiplexing between the FDM-PUCCH and the SRS. A muted RE in the REG constituting the FDM-PUCCH may be used as a resource for transmitting the SRS or may be used as a resource for transmitting the UCI in the REG when the FDM-PUCCH and the SRS are not multiplexed in the same symbol.

For example, if it is desired to support multiplexing between the SRS and the FDM-PUCCH, there is a problem in that resource utilization efficiency of a symbol resource is lowered when only a TDM scheme is supported, and sequence design of the SRS and an FDM-PUCCH DM-RS is restrictive when a CDM scheme is supported. If FDM is supported in units of RBs corresponding to N REs on the frequency axis, since it is difficult for the SRS to consecutively occupy a frequency resource, the SRS has difficulty in satisfying a low PAPR characteristic during transmission. Accordingly, the present disclosure proposes a method of easily multiplexing the SRS and the FDM-PUCCH by muting specific REs in the FDM-PUCCH at uniform intervals while supporting FDM between the SRS and the FDM-PUCCH. If the FDM-PUCCH and the SRS are not multiplexed in the same symbol, the muted REs may be used as REs for transmitting the UCI of the FDM-PUCCH without being muted. Whether the muted REs are actually muted or are available as REs for transmitting the UCI may be dynamically indicated by the eNB to the UE through DCI or may be configured through a higher layer signal when a PUCCH resource is configured.

Proposed Method #4 described above may be applied together in combination with other proposed methods of the present disclosure unless Proposed Method #4 is contradictory to the other proposed methods.

3.5. Proposed Method #5: Method of Independently Configuring a PUCCH Resource Set (Set 1) for a Slot (or Symbol) in which an SRS is Transmitted and a PUCCH Resource Set (Set 2) for a Slot (or Symbol) in which the SRS is not Transmitted, when the eNB Preconfigures the PUCCH Resource Sets and then Indicates a PUCCH Resource to be Used by the UE within the Configured PUCCH Resource Set Through DCI According to an embodiment, the UE may interpret a PUCCH resource indicated by the DCI under the assumption that Set 1 is a valid PUCCH resource set when the SRS is transmitted in a specific slot and that Set 2 is a valid PUCCH resource set when the SRS is not transmitted.

In addition, the eNB may inform the UE whether the SRS is transmitted in a specific slot through a higher layer signal or dynamic signaling.

For example, the eNB may configure a PUCCH resource set for a 1-symbol FDM-PUCCH for the UE. In this case, in a symbol in which the SRS is transmitted, the FDM-PUCCH may be desirably transmitted in the form of a comb resource in consideration of multiplexing with the SRS, as illustrated in FIG. 12. In addition, in a symbol in which the SRS is not transmitted, the FDM-PUCCH may be desirably transmitted using all consecutive REs as illustrated in FIG. 9. Accordingly, the PUCCH resource set for the FDM-PUCCH may be independently configured with respect to a slot in which the SRS is transmitted and a slot in which the SRS is not transmitted.

For example, the eNB may independently set the PUCCH resource set (Set 1) for the slot in which the SRS is transmitted and the PUCCH resource set (Set 2) for the slot in which the SRS is not transmitted. In this case, the UE may interpret a PUCCH resource indicated by the DCI under the assumption that Set 1 is a valid PUCCH resource set when the SRS is transmitted in a specific slot and that Set 2 is a valid PUCCH resource set when the SRS is not transmitted in the specific slot.

Proposed Method #5 described above may be applied together in combination with other proposed methods of the present disclosure unless Proposed Method #5 is contradictory to the other proposed methods.

3.6. Proposed Method #6: Method of Differently Applying a TxD Scheme According to Whether Frequency Hopping Between Symbols is Applied when a 2-Symbol Short-PUCCH is Transmitted According to an embodiment, the TxD scheme may be differently applied according to whether the short-PUCCH is a SEQ-PUCCH structure or an FDM-PUCCH structure and whether frequency hopping is applied as follows.

(1) Case in which the SEQ-PUCCH structure or the RS/UCI interlacing structure is repeated in two symbols A Spatial Orthogonal Resource Transmit Diversity (SORTD) scheme may be applied as the TxD scheme. When frequency hopping is not applied, a SORTD or Space Time Block Coding (STBC) scheme may be applied as the TxD scheme. When frequency hopping is not applied, if the SORTD scheme is applied, an OCC may be applied to symbols. In addition, the STBC scheme may be applied only to the RS/UCI interlacing structure.

(2) Case in which the FDM-PUCCH structure is repeated in two symbols

If frequency hopping is applied, the SFBC scheme may be applied. If frequency hopping is not applied, the SFBC or STBC scheme may be applied. In addition, if frequency hopping is not applied and the SFBC scheme is applied, the OCC may be applied to symbols.

The RS/UCI interlacing structure may imply a structure in which one of two sequences crossed on the frequency axis is used as the RS and the remaining sequence is used as the UCI. In this case, the sequence used as the UCI may represent UCI by multiplying an M-PSK (e.g., QPSK) modulation symbol by the remaining sequence.

In addition, when the UCI payload is small, the RS/UCI interlacing structure in which one of two sequences crossed on the frequency axis is used as the RS and the remaining sequence is used as the UCI may be considered as a special case of the FDM-PUCCH structure. In this case, the sequence used as the UCI may represent the UCI using a sequence modulation scheme by multiplying the M-PSK (e.g., QPSK) modulation symbol by the remaining sequence. When the RS/UCI interlacing structure is transmitted in one symbol, it is impossible to perform SFBC paring. Therefore, the SORTD scheme for achieving TxD additionally using orthogonal resources for a PUCCH may be applied.

If a sequence constituting RS/UCI interlacing is a CAZAC sequence, the orthogonal resources for the PUCCH may be distinguished on the frequency axis or may be distinguished by different CS values of the CAZAC sequence. However, when the RS/UCI interlacing structure is transmitted in two symbols, it is possible to perform STBC paring. Therefore, TxD may be achieved without the need of additionally using the orthogonal resources for the PUCCH. That is, when a 2-symbol short-PUCCH is transmitted, the TxD scheme applied to the short-PUCCH may differ according to whether frequency hopping between symbols is applied.

Proposed Method #6 described above may be applied together in combination with other proposed methods of the present disclosure unless Proposed Method #6 is contradictory to the other proposed methods.

3.7. Proposed Method #7: Method of Applying a TxD Scheme when an FDM-PUCCH is Configured by an REG Unit and the Number of REs in an REG is an Odd Number (e.g., 2*N+1)

(1) Option 1

SFBC pairing may be applied to 2*N REs in the REG and the REs may be used for SFBC-based data transmission. The remaining one RE in the REG may be used to transmit data through a specific antenna port (or transmit data by applying an antenna port selection diversity scheme) or to transmit a Scheduling Request (SR).

(2) Option 2

SFBC pairing may be applied to 2*(N−1) REs in the REG and the REs may be used for SFBC-based data transmission. A quasi-orthogonal SFBC scheme may be applied to the remaining three REs in the REG.

For example, when the REG is composed of 12 REs and RS density is ¼, the number of REs that transmit UCI in the REG may be 9, which is not an even number. Accordingly, one RE that cannot form SFBC pairing may be present. The remaining one RE may still be used to transmit the UCI. In this case, the remaining one RE may be used to transmit the UCI through a specific antenna port without applying the SFBC scheme. According to an embodiment, a method of using one remaining RE as a resource for transmitting an SR, which is information for requesting UL scheduling by the UE, without being used for the purpose of transmitting the UCI, may be considered.

Proposed Method #7 described above may be applied together in combination with other proposed methods of the present disclosure unless Proposed Method #7 is contradictory to the other proposed methods.

3.8. Proposed Method #8: Method of Differently Configuring a DM-RS Transmission Scheme According to a TxD Scheme when a 2-Symbol FDM-PUCCH is Transmitted (1) Application of SFBC A. Option 1

DM-RSs for two antenna ports may be transmitted in different symbols. For example, a DM-RS for antenna port 0 may be transmitted in the first symbol and a DM-RS for antenna port 1 may be transmitted in the second symbol. Herein, the above operation may be applied only when frequency hopping between symbols is not applied.

Option 2

The DM-RSs for the two antenna ports may be transmitted on two code resources distinguished by OCCs in the time domain with respect to two adjacent REs corresponding to the same subcarrier in two symbols. For example, the DM-RS for antenna port 0 may be transmitted on a code resource corresponding to an OCC [+1+1] and the DM-RS for antenna port 1 may be transmitted on a code resource corresponding to an OCC [+1−1]. Herein, the above operation may be applied only when frequency hopping between symbols is not applied.

(2) Application of STBC

A. Option 1

The DM-RSs for two antenna ports may be allocated to different REs in the same symbol or transmitted on two code resources distinguished by OCCs in the frequency domain with respect to two adjacent REs. For example, the DM-RS for antenna port 0 may be transmitted on a code resource corresponding to OCC [+1+1] and the DM-RS for antenna port 1 may be transmitted on a code resource corresponding to OCC [+1−1].

For example, if the SFBC scheme is applicable during transmission of the 2-symbol FDM-PUCCH, this may be an environment having a high correlation between channels on the frequency axis. Therefore, increasing DM-RS density on the time axis may be advantageous in terms of channel estimation performance. If the STBC scheme is applicable to the 2-symbol FDM-PUCCH, since this may be an environment having a high correlation between channels on the time axis, increasing DM-RS density on the frequency axis may be advantageous in terms of channel estimation performance. Accordingly, the present disclosure proposes a method of differently allocating the DM-RS for each antenna port according to the TxD scheme. For example, if the SFBC scheme is applied, DM-RSs for two antenna ports may be transmitted in different symbols or may be transmitted on different code resources by applying OCCs on the time axis to two symbols in the same subcarrier. When the STBC scheme is applied, DM-RSs for two antenna ports may be transmitted on different REs in the same symbol or may be transmitted on different code resources by applying OCCs on the frequency axis to two REs on the frequency axis in the same symbol.

Figure 15:
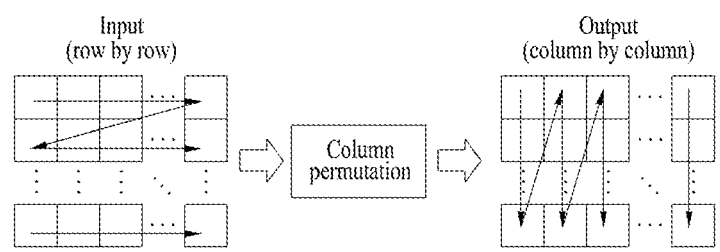
FIG. 15 illustrates a process of performing block interleaving according to an embodiment.

FIG. 15 illustrates a process of performing block interleaving according to an embodiment.

First, the following parameters are defined for convenience of description.

(1) M: The minimum number of UCI REs per symbol (e.g., M=16 with DM-RS overhead of ⅓)

For example, M may be the number of UCI REs included in a minimum resource unit (e.g., 2 PRBs) constituting one PUCCH. In this case, the minimum resource unit may be composed of consecutive RBs (or REs).

(2) L: The number of localized UCI REs per symbol (e.g., L=a×M)

For example, L may be the number of UCI REs included in one cluster when resources constituting one PUCCH are allocated in a multi-cluster form. In this case, the cluster may be composed of one or more consecutive minimum resource units, and the multi-cluster may be composed of a plurality of continuous or discontinuous clusters.

(3) K: The total number of UCI REs per symbol (e.g., K=b×M)

For example, K may be the total number of resources constituting one PUCCH and may be, for example, the total number of UCI REs included in a multi-cluster.

(4) N: The number of OFDM symbols (with UCI) (e.g., N is a value of 1 or more)

For example, N may be the number of OFDM symbols in which one PUCCH is transmitted.

Referring to FIG. 15, (N1)×(N2) block interleaving inputs and outputs a data stream composed of bits or demodulated symbols, thereby interleaving orders between the bits and the demodulated symbols in the data stream.

Referring to FIG. 15, data may be input row by row to a matrix having N1 rows and N2 columns. Thereafter, pseudo random permutation may be applied to N2 columns of the (N1)×(N2) matrix and an interleaved data stream may be output column by column with respect to the (N1)×(N2) matrix to which pseudo random permutation is applied.

In this case, RE mapping for coded bits (or demodulated symbols) may be performed as follows with respect to a 1-symbol short-PUCCH.

(1) (c×M)×(b/c) block interleaving may be applied to the UCI coded bits (or demodulated symbols). In this case, the value of c may be set within a range of (1 ☐c ☐a), for example, to 1 or a. In addition, block interleaving may be performed in units of coded bits or QPSK symbols.

(2) Output of block interleaving may be mapped by a frequency-first scheme to a plurality of RBs (or REs) configured as a short-PUCCH transmission resource. For example, when the value of c is 1 and a 1-symbol short-PUCCH is composed of P minimum resource allocation units, the UCI coded bits (or demodulated symbols) may be distributively mapped to the P minimum resource allocation units. For example, QPSK-modulated symbols for UCI may be sequentially mapped to the 0-th resource unit, the first resource unit, . . . , (P−1)-th resource unit, and then may be distributively allocated in a scheme of being mapped again to the 0-th resource unit, the first resource unit, . . . , (P−1)-th resource unit. Accordingly, adjacent bits in the UCI coded bits are scattered on the frequency axis so that a bit error may be dispersed in the UCI coded bits. Thus, a Forward Error Correction (FEC) code may more effectively correct bit errors.

Similarly, for a 2-symbol short-PUCCH, RE mapping for coded bits (or modulated symbols) may be performed as follows.

(1) Method 1

(c×M)×(b/c×N) block interleaving may be applied to the UCI coded bits (or modulated symbols). In this case, the value of c may be set within a range of (1 ☐c ☐a), for example, c may be set to 1 or a, but is not limited thereto. In addition, block interleaving may be performed in units of coded bits or QPSK symbols. Output of block interleaving may be mapped to a plurality of RBs (or REs) configured as a short-PUCCH transmission resource in a plurality of symbols according to a frequency-first scheme.

(2) Method 2

When frequency hopping is not applied, UCI may be mapped to (K×N) REs according to a time-first mapping scheme. In this case, N and K may be the number of symbols allocated to the short-PUCCH and the number of REs on the frequency axis, respectively. In addition, when frequency hopping is applied, a frequency offset according to frequency hopping may be applied to RE mapping at every time at which frequency hopping is applied based on UCI-to-RE mapping in the case in which there is no frequency hopping.

Proposed method #8 may be applied together in combination with other proposed methods of the present disclosure unless Proposed Method #8 is contradictory to the other proposed methods.

3.9 Proposed Method #9: Method of Differently Setting the Minimum Number of PRBs Allocable for a Short-PUCCH Per UL Waveform (or RS Sequence) and/or UCI Payload Size when the Short-PUCCH is Transmitted For example, when a UL waveform is a Discrete Fourier Transform-spread-OFDM (DFT-s-OFDM) scheme, a CAZAC sequence such as a Zadoff-Chu sequence may be applied as an RS sequence to relieve a PAPR. On the other hand, if the UL waveform is a CP-OFDM scheme, since there is no restriction to a low PAPR, a Pseudo Noise (PN) sequence, such as an M-sequence and a Gold sequence, may be applied as the RS sequence. Since the CAZAC sequence should satisfy a low PAPR and a low auto/cross-correlation condition, if the length of the sequence is too short, it may not be easy to perform design and the number of available sequences may be limited. Therefore, when the CAZAC sequence (on the frequency axis) is applied as the DM-RS of the short-PUCCH, a sufficient PRB should be ensured so that the length of the sequence may not be too short. In the case of the PN sequence, since constraints on a PAPR and correlation are relatively weak, relatively few PRBs may be allocated. That is, the minimum number of PRBs to be allocated for the FDM-PUCCH may vary according to the UL waveform or the DM-RS sequence of the short-PUCCH.

In addition, when the payload size of the UCI is small, even if a relatively small number of PRBs is allocated, a sufficiently low coding rate may be achieved. If the payload size of the UCI is large, a relatively large number of PRBs should be allocated to achieve a sufficiently low coding rate. Therefore, the minimum number of PRBs that should be allocated to the short-PUCCH may be differently configured according to the payload size of the UCI.

Proposed Method #9 described above may be applied together in combination with other proposed methods of the present disclosure unless Proposed Method #9 is contradictory to the other proposed methods.

3.10. Proposed Method #10: Method of Distinguishing Between DM-RS Resources by Applying Time-Domain OCCs to DM-RSs of a Short-PUCCH Transmitted in Plurality of Symbols and Transmitting UCI when a 2-Symbol Short-PUCCH is Transmitted (1) Repeated transmission of the same UCI to two symbols (2) Distributive transmission of coded bits for UCI to two symbols Herein, the above-described operation may be applied when frequency hopping between symbols is not applied to the 2-symbol short-PUCCH.

For example, when the 2-symbol short-PUCCH is transmitted, a DM-RS may be transmitted in each symbol so that DM-RSs may be transmitted in a total of two symbols. In an environment in which channel variation on the time axis is not large, DM-RS resources may be doubled by applying a length-2 OCC on the time axis to the DM-RS. The increased DM-RS resources may be used for the purpose of allocating orthogonal DM-RS resources for each UE when a plurality of UEs transmit short-PUCCHs by a Multi-User Multiple-Input and Multiple-Output (MU-MIMO) scheme. Alternatively, the increased DM-RS resources may be used when transmitting DM-RS resources for a plurality of antenna ports in terms of one UE. In this case, if the UCI is also repeatedly transmitted in the two symbols, UCI transmission resources for a plurality of UEs may also be distinguished by orthogonal resources by applying a time-domain OCC to the UCI. Meanwhile, when coded bits for the UCI are distributively transmitted in the two symbols, only DM-RSs for the plural UEs may be distinguished by orthogonal resources using the MU-MIMO scheme and transmission resources for the UCI may not be distinguished by the orthogonal resources.

Proposed Method #10 described above may be applied together in combination with other proposed methods of the present disclosure unless Proposed Method #10 is contradictory to the other proposed methods.

3.11 Proposed Method #11: Method of Supporting One or More of the Following Transmission Structures by a Basic Transmission Unit (or Localized Mapping) for a 1-Symbol SEQ-PUCCH (1) Option 1: Allocation of a Sequence to Consecutive REs FIGS. 16(a) and 16(b) are diagrams illustrating examples of a basic transmission unit for a SEQ-PUCCH.

Figure 16:
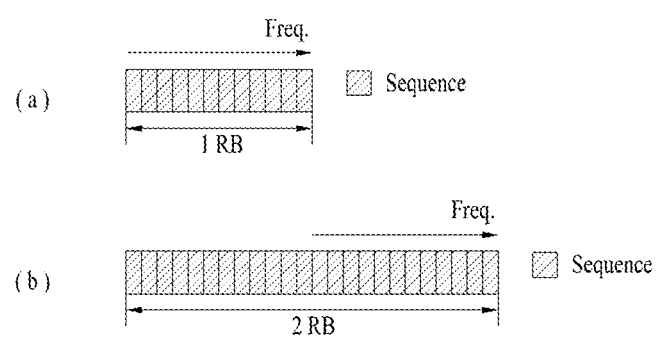
FIGS. 16(a) and 16(b) are diagrams illustrating examples of a basic transmission unit for a SEQ-PUCCH.

For example, referring to FIG. 16 (a), when the number of subcarriers of one RB is 12, a length-12 sequence may be allocated to one RB. In addition, referring to FIG. 16 (b), when the number of subcarriers of one RB is 12, a length-24 sequence may be allocated to two RBs.

(2) Option 2: Allocation of a Sequence to REs in an X-Comb Structure

Figure 17:
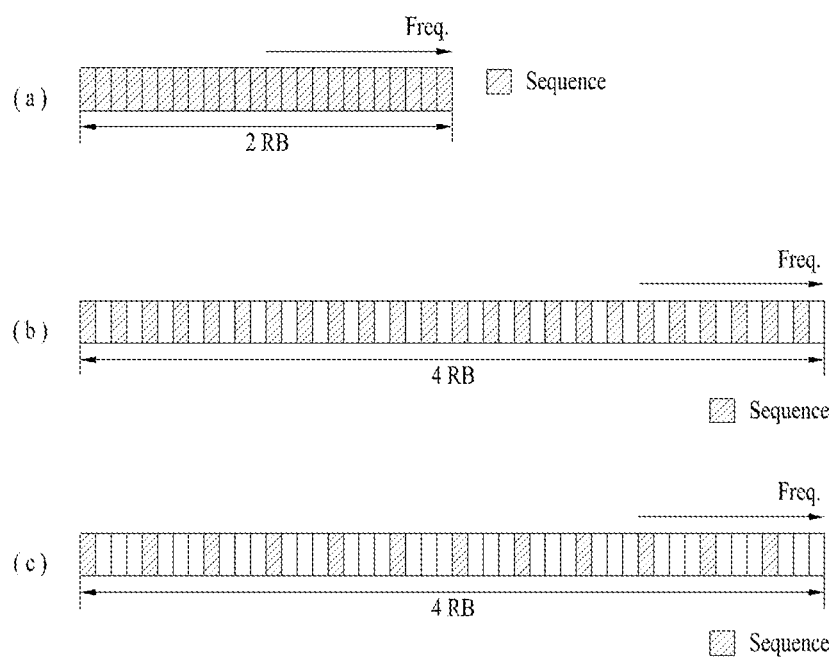
FIGS. 17(a) to 17(c) are diagrams illustrating a method of allocating a sequence in the form of a comb resource according to an embodiment.
Figure 18:
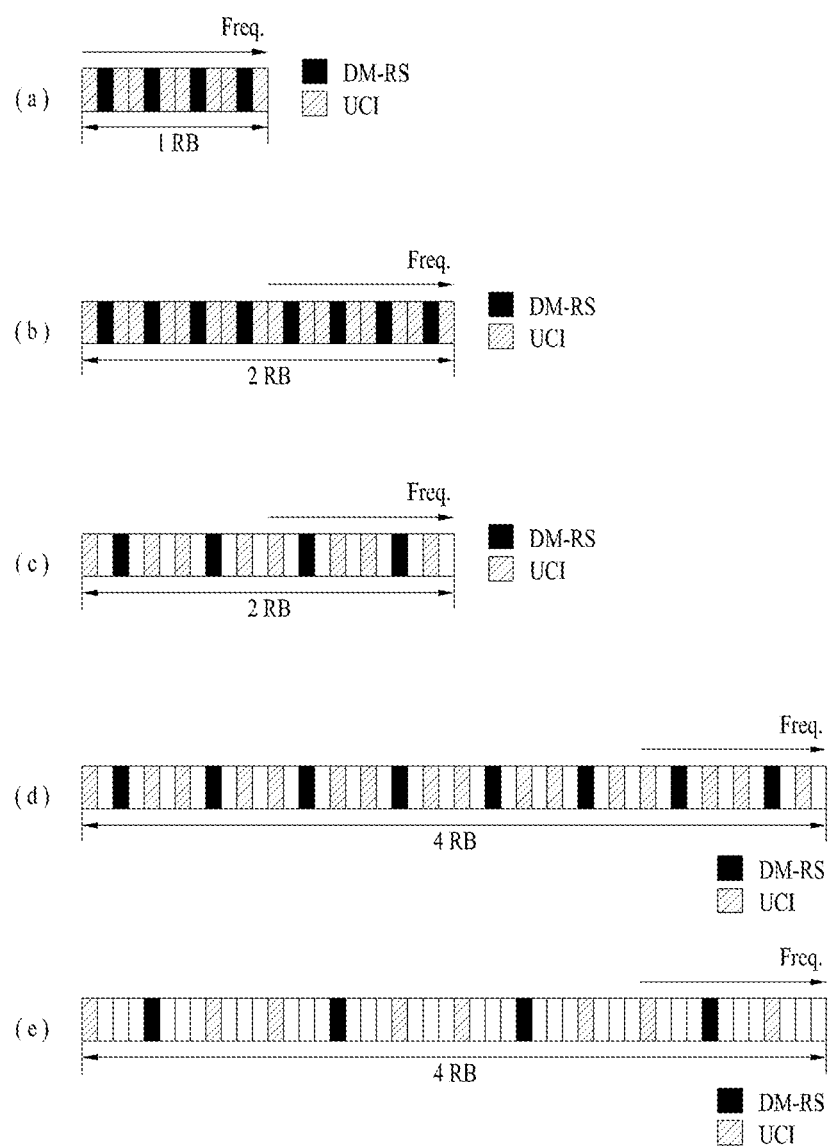
FIGS. 18(a) to 18(e) are diagrams illustrating structures of a basic transmission unit for 1-symbol FDM-PUCCH according to an embodiment.

FIGS. 17(a) to 17(c) are diagrams illustrating a method of allocating a sequence in the form of a comb resource according to an embodiment.

For example, referring to FIG. 17(a), when a number of subcarriers of one RB is 12, a length-12 sequence may be allocated to two RBs in the form of an odd (or even) comb resource. Referring to FIG. 17(b), when the number of subcarriers of one RB is 12, a length-24 sequence may be allocated to two RBs in the form of an odd (or even) comb resource. Referring to FIG. 17(c), when the number of subcarriers of one RB is 12, a length-12 sequence may be allocated to 4 RBs in a 4-comb resource form.

In this case, a specific sequence belonging to the aforementioned SEQ-PUCCH may be transmitted in the basic transmission unit.

Herein, the X-comb resource may mean a set of subcarriers configured by selecting one subcarrier at intervals of X subcarriers among consecutive subcarriers in a symbol on the frequency axis. In this case, a subcarrier index k may be a value satisfying the following Equation 6.

$$k = X \times i + j, i = 0, 1, \ldots, j \in \{0, 1, \ldots, X-1\}$$ [Equation 6]

In this case, the eNB may configure one or more options among options for the basic transmission unit (or localized mapping) of the SEQ-PUCCH for the UE and indicate one option to be actually used among the configured options through DCI.

The UE may transmit the SEQ-PUCCH by selecting Option 1 or Option 2 according to whether SRS transmission is performed in a specific UL transmission symbol. For example, if the SRS is not transmitted in the symbol, the UE may select Option 1 and, if the SRS is transmitted in the symbol, the UE may select Option 2.

Herein, for some (e.g., option of allocating a sequence having a length of 24 to two RBs by a comb resource structure when the number of subcarriers of one RB is 12) of the above-described options for the basic transmission unit (or localized mapping) of the SEQ-PUCCH, the same sequence type as the SRS may be used as the sequence of SEQ-PUCCH.

For example, when the self-contained slot structure is introduced as illustrated in FIG. 6, UCI may be transmitted in rear symbols in a slot. In this case, in order to increase efficiency of UL resource utilization, the UL transmission symbols may be used not only to transmit a short-PUCCH but also to transmit an SRS having a relatively short transmission interval. In this case, since the short-PUCCH and the SRS may be simultaneously transmitted in one UL transmission symbol, FDM-based multiplexing should be supported between the short-PUCCH and the SRS. In this case, if a frequency-axis resource for the SRS has an X-comb structure, the transmission structure of the short-PUCCH may also be designed to conform to the X-comb structure, thereby supporting RE-level FDM between the SRS and the short-PUCCH. In view of the above description, the present disclosure proposes a method including an X-comb type transmission structure as the basic transmission unit of the SEQ-PUCCH. For example, if the SRS in the NR system is configured by subcarriers on a 2-comb resource like the SRS in the LTE system and is designed by a Zadoff-Chu sequence having a sequence length corresponding to a multiple of 4 RBs, a specific sequence in the SEQ-PUCCH may have the same sequence type as the SRS having a sequence length corresponding to 4 RBs. In this case, when different comb resources are allocated to the sequence belonging to the SEQ-PUCCH and the SRS, then the SEQ-PUCCH and the SRS may be multiplexed according to the FDM scheme at an RE level. Alternatively, even if the same RE resource in the same comb resource is allocated, the SEQ-PUCCH and the SRS may be multiplexed according to the CDM scheme by applying different CS values.

As an additional operation of Proposed Method #11, when the eNB supports different sequence lengths (or different numbers of REs) for the basic transmission unit (or localized mapping) of the SEQ-PUCCH, the number of CSs (or CS gaps) to be actually available in a single basic transmission unit for the SEQ-PUCCH may be different according to a sequence length. For example, if the length of the sequence is 12, the CS gap may be set to 2 and only 6 CSs may be used in one basic unit. In addition, when the length of the sequence is 24, the CS gap may be set to 3 and 8 CSs may be used in one basic unit. In this case, the CS gap means a difference between adjacent CS values among CS values to be actually used in the basic transmission unit of the SEQ-PUCCH.

As an additional operation of Proposed Method #11, when the eNB represents N-bit UCI by 1-symbol SEQ-PUCCH, a PUCCH resource indicated by one state in an ACK-NACK Resource Indicator (ARI) may be a sequence set consisting of 2N sequences distinguished in terms of time, frequency, and CSs. When the ARI indicates a specific state, a sequence set corresponding to the state is selected and which sequence is selected in the sequence set and is transmitted may be determined according to which state the N-bit UCI indicates. In this case, the ARI may mean a bit field in DCI indicating one of M preconfigured PUCCH resources. For example, if N is 4, 4 sequences in the sequence set indicated by the ARI may correspond to {ACK, ACK}, {ACK, NACK}, {NACK, ACK}, {NACK, NACK}.

Meanwhile, when the eNB indicates the N-bit UCI by a 2-symbol SEQ-PUCCH, a PUCCH resource indicated by one state in the ARI may be a sequence pair set consisting of $2^N$ sequence pairs distinguished in terms of time, frequency, or CSs. In this case, the sequence pair means a sequence pair formed by allocating a sequence per symbol to two symbols. Two sequences allocated to different symbols within one sequence pair may be distinguished in terms of a CS/base sequence. For example, if an ARI indicates a specific state, a sequence pair set corresponding to the state is selected and which sequence pair is selected and transmitted in the sequence pair set may be determined according to which state the N-bit UCI indicates. When N=4, 4 sequence pairs in the sequence pair set indicated by the ARI may correspond to {ACK, ACK}, {ACK, NACK}, {NACK, ACK}, and {NACK, NACK}, respectively.

Proposed Method #11 described above may be applied together in combination with other proposed methods of the present disclosure unless Proposed Method #1 is contradictory to the other proposed methods.

3.12 Proposed Method #12: Method of Configuring an Extended Transmission Structure (or Distributed Mapping) for a SEQ PUCCH by a Plurality of Basic Transmission Units (or Localized Mapping) Having Different Frequency Resources for a 1-Symbol SEQ-PUCCH When a basic transport unit (or localized mapping) for the SEQ-PUCCH may have one or more transmission structures, the extended transmission structure (or distributed mapping) for the SEQ-PUCCH may be configured by one of the following schemes.

Option 1: Scheme in which multiple basic transmission units (or localized mapping) included in the extended transmission structure (or distributed mapping) for the SEQ-PUCCH have the same transmission structure Option 2: Scheme in which multiple basic transmission units (or localized mapping) included in the extended transmission structure (or distributed mapping) for the SEQ-PUCCH have independent (or different) transmission structures In this case, the basic transmission unit (localized mapping) for the SEQ-PUCCH may have a plurality of transmission structures in terms of sequence length, RE mapping (e.g., comb), and CS. The basic transmission unit (or localized mapping) for the SEQ-PUCCH may conform to Proposed Method #11 described above.

For example, even when the SEQ-PUCCH is transmitted in one symbol, frequency diversity may be obtained by simultaneously transmitting a plurality of sequences distributed on the frequency axis. When a structure of transmitting the SEQ-PUCCH on resources distributed on the frequency axis is an extended transmission structure or distributed mapping for the SEQ-PUCCH, the extended transmission structure may be configured by multiple basic transmission units (or localized mapping) for the predefined SEQ-PUCCH as in Proposed Method #11. In this case, the same transmission structure constituting the extended transmission structure for the SEQ-PUCCH may be configured or a different (or independent) transmission structure may be configured.

Proposed Method #12 described above may be applied together in combination with other proposed methods of the present disclosure unless Proposed Method #12 is contradictory to the other proposed methods.

As an additional operation of Proposed Method #11 and Proposed Method #12, a basic transmission unit for the SEQ-PUCCH per symbol may be transmitted or an extended transmission unit for the SEQ-PUCCH per symbol may be transmitted, when a 2-symbol SEQ-PUCCH is configured. In this case, frequency hopping may be applied when the basic transmission unit for the SEQ-PUCCH is transmitted and frequency hopping may not be applied when the extended transmission unit for the SEQ-PUCCH is transmitted. In addition, the transmission structure of the SEQ-PUCCH per symbol transmitted in different symbols may be differently configured.

3.13 Proposed Method #13: Method of Supporting One or More of the Following Transmission Structures as a Basic Transmission Unit (or Localized Mapping) for a 1-Symbol FDM-PUCCH (1) Option 1: Allocation of a DM-RS and UCI to Consecutive REs FIGS. 18(a) to 18(e) are diagrams illustrating structures of a basic transmission unit for 1-symbol FDM-PUCCH according to an embodiment.

Referring to FIG. 18(a), as Option 1-1, when the number of subcarriers of one RB is 12, 12 REs for the DM-RS and the UCI may be allocated to one RB with an RS density of ⅓. In addition, referring to FIG. 18(b), when the number of subcarriers of one RB is 12, 24 REs for the DM-RS and UCI may be allocated to two RBs with an RS density of ⅓, as Option 1-2.

(2) Option 2: Allocation of the DM-RS and the UCI to REs in an X-Comb Resource Structure Referring to FIG. 18(c), when the number of subcarriers of one RB is 12, 12 REs for the DM-RS and UCI may be allocated to an odd or even comb resource with an RS density of ⅓, as Option 2-1.

Referring to FIG. 18(d), when the number of subcarriers of one RB is 12, 24 REs for the DM-RS and UCI may be allocated to an odd or even comb resource of 4 RBs with an RS density of ⅓, as Option 2-2.

Referring to FIG. 18(e), when the number of subcarriers of one RB is 12, 12 REs for the DM-RS and UCI may be allocated to a 4-comb resource of 4 RBs with an RS density of ⅓, as Option 2-3.

In this case, the X-comb resource may mean a subcarrier set configured by selecting one subcarrier at intervals of X subcarriers among consecutive subcarriers in a symbol on the frequency axis. For example, a subcarrier index k of the subcarrier set may satisfy the following Equation 7.

$$k = X \times i + j, i = 0, 1, \ldots, j \in \{0, 1, \ldots, X-1\} \qquad \text{[Equation 7]}$$

The eNB may configure one or more options among the options for the basic transmission unit (or localized mapping) of the FDM-PUCCH for the UE and indicate one option to be actually used among the one or more configured options through the DCI.

The UE may transmit the FDM-PUCCH by selecting Option 1 or Option 2 according to whether an SRS is transmitted in a specific UL transmission symbol. For example, the UE may select the structure of Option 1 when the SRS is not transmitted in a specific UL transmission symbol and select the structure of Option 2 when the SRS is transmitted in a specific UL transmission symbol.

As mentioned in Proposed Method #11, for efficient utilization of a UL resource, a method of supporting SRS transmission in a UL transmission symbol in which a short-PUCCH is transmitted may be considered. In this case, the FDM-PUCCH and the SRS may be simultaneously transmitted in one symbol. Therefore, FDM-based multiplexing with the SRS should be supported. When the SRS is configured by subcarriers in the X-comb resource structure, the FDM-PUCCH may be designed to be transmitted on an X-comb resource as well. In this case, FDM-based multiplexing of an RE-level may be supported between the SRS and the FDM-PUCCH.

As an additional operation of Proposed Method #13, an operation of performing PRB extension by combining a plurality of adjacent basic transmission units (or localized mapping) may be considered.

For example, the FDM-PUCCH may be extended to 72 REs on a 2-comb resource in 12 contiguous RBs by concatenating three structures according to Option 2-2 described above. In addition, when a Frequency Domain Orthogonal Cover Code (FD-OCC) is applied to REs for DM-RS transmission, a unit (or REG bundling) to which the FD-OCC is applied for the DM-RS may be a subset of a basic transmission unit. For example, when the DM-RS and UCI are transmitted on 12 REs on the frequency axis, the FD-OCC for the DM-RS may be applied in units of 6 REs on the frequency axis or may be applied in units of 12 REs on the frequency axis.

Proposed Method #13 described above may be applied together in combination with other proposed methods of the present disclosure unless Proposed Method #13 is contradictory to the other proposed methods.

3.14 Proposed Method: #14: Method of Configuring an Extended Transmission Structure for an SEQ-PUCCH in Multiple Basic Transmission Units Having a Different Frequency Resource for a 1-Symbol FDM-PUCCH When a basic transmission unit (or localized mapping) for the FDM-PUCCH may have one or more transmission structures, an extended transmission structure (or distributed mapping) for the FDM-PUCCH may be configured by one of the following schemes.

(1) Option 1: Scheme in which plural basic transmission units included in the extended transmission structure for the FDM-PUCCH have the same transmission structure (2) Option 2: Scheme in which plural basic transmission units included in the extended transmission structure for the FDM-PUCCH have independent (or different) transmission structures In this case, the basic transmission unit for the FDM-PUCCH may have a plurality of transmission structures in terms of the number of allocated REs and RE mapping (e.g., comb) and the basic transmission unit for the SEQ-PUCCH may conform to Proposed Method #11 described above.

For example, in order to obtain frequency diversity, a plurality of sequences distributed on the frequency axis may be simultaneously transmitted even when the FDM-PUCCH is transmitted in one symbol. When a structure of transmitting the FDM-PUCCH on resources distributed on the frequency axis is called an extended transmission structure (or distributed mapping) for the FDM-PUCCH, the extended transmission structure for the FDM-PUCCH may be configured by a plurality of basic transmission units for a predefined FDM-PUCCH as in Proposed Method #13 similar to Proposed Method #12. In this case, the same transmission structure constituting the extended transmission structure for the FDM-PUCCH may be configured or a different (or independent) transmission structure may be configured.

Proposed Method #14 described above may be applied together in combination with other proposed methods of the present disclosure unless Proposed Method #14 is contradictory to the other proposed methods.

As an additional operation of Proposed Method #13 and Proposed Method #14, a basic transmission unit for the FDM-PUCCH per symbol may be transmitted or an extended transmission unit for the FDM-PUCCH per symbol may be transmitted, when a 2-symbol FDM-PUCCH is configured. In this case, frequency hopping may be applied when the basic transmission unit for the FDM-PUCCH is transmitted and frequency hopping may not be applied when the extended transmission unit for the FDM-PUCCH is transmitted. In addition, the transmission structure of the FDM-PUCCH per symbol transmitted in different symbols may be differently configured.

3.15 Proposed Method #15: Method of Transmitting a Plurality of Sequences (Representing the Same UCI) on a Plurality of PUCCH Resources Having a Different Antenna Port (Per PUCCH Resource) by a TxD Scheme for a SEQ-PUCCH Multiplexing may be supported on a plurality of PUCCH resources according to a scheme of one or more combinations of TDM, FDM, and CDM schemes. In this case, the plural sequences transmitted on the plural PUCCH resources may be distinguished from each other in terms of a CS and/or a basic sequence to which the CS is applied. In this case, the PUCCH resource means a time and frequency resource capable of transmitting one sequence corresponding to the SEQ-PUCCH.

When the plural PUCCH resources are distinguished by the TDM scheme, a power offset value may be applied as compared with the case in which the TxD scheme is not applied.

For example, when a specific sequence is transmitted through the SEQ-PUCCH, the sequence may be repeatedly transmitted on two PUCCH transmission resources and a transmission antenna port may be differently applied to each PUCCH transmission resource. In this case, the same sequence may experience different antenna ports, thereby obtaining additional spatial diversity gain. In this case, the above-described two PUCCH transmission resources may be resources FDMed or CDMed in the same symbol or resources TDMed in different symbols. In particular, when the antenna port for each TDMed PUCCH resource transmits a plurality of sequences for the SEQ-PUCCH on different PUCCH resources, much transmission energy may be used as compared with the case in which the plural PUCCH resources are FDMed or CDMed. For example, if transmit power per symbol is maintained at the same level as a level when no TxD scheme is applied, only transmit power corresponding to one symbol is used when the TxD scheme for transmitting plural sequences on plural FDMed or CDMed PUCCH resources having a different antenna port (per PUCCH resource) is applied. However, when the TxD scheme for transmitting a plurality of sequences on a plurality of TDMed PUCCH resources having a different antenna port (per PUCCH resource), transmit power corresponding to two symbols is used. In this case, when the transmit power for each antenna port is preconfigured based on transmission in one symbol, power boosting for transmit power per antenna port as compared with the case in which the TxD scheme is not applied may be applied when the TxD scheme for transmitting the plural sequences on plural different TDMed PUCCH resources having a different antenna port (per PUCCH resource) is applied.

An additional operation of Proposed Method #15 may consider the following two cases when M PUCCHs (e.g., sequences) (representing the same UCI) are transmitted on M PUCCH resources having a different antenna port (per PUCCH resource) by the TxD scheme for the PUCCH (e.g., SEQ-PUCCH).

(1) Case 1: Case in which a plurality of PUCCH resources is multiplexed by the TDM scheme in the same slot (2) Case 2: Case in which a plurality of PUCCH resources is multiplexed by the FDM or CDM scheme When the TxD scheme is applied, a power offset per antenna port may be differently set in Case 1 and Case 2.

For example, a power offset (e.g., −3 dB) that lowers power per antenna port may be applied when the TxD scheme is applied according to Case 2 and the power offset that lowers power per antenna port may not be applied when the TxD scheme is applied according to Case 1, based on power (e.g., P) when the TxD scheme is not applied (i.e., transmission of a single antenna port). For example, if M is 2 and power when transmission is performed through a single antenna port is P, power per antenna port may be reduced to P/2 in Case 2 and power per antenna port may still be P in Case 1.

Proposed Method #15 described above may be applied together in combination with other proposed methods of the present disclosure unless Proposed Method #15 is contradictory to the other proposed methods.

3.16 Proposed Method #16: Method of Transmitting a 2-Symbol PUCCH According to One of the Following Schemes by a TxD Scheme for the 2-Symbol PUCCH Option 1: Allocation of a (2-symbol) PUCCH resource to each antenna port That is, a PUCCH resource per antenna port may be transmitted in two symbols. In this case, 2-symbol PUCCH resources for different antenna ports may be multiplexed by the FDM or CDM scheme.

(2) Option 2: Allocation of a 1-symbol PUCCH resource constituting a 2-symbol PUCCH resource to each antenna port That is, a PUCCH resource per antenna port may be transmitted in one symbol. In this case, 1-symbol PUCCH resources for different antenna ports may be multiplexed by the FDM, CDM, or TDM scheme. In addition, the same UCI for the 2-symbol PUCCH may be repeatedly transmitted in two symbols or the UCI may be distributively transmitted in two symbols. In this case, the 2-symbol PUCCH may be a 2-symbol SEQ-PUCCH or a 2-symbol FDM-PUCCH.

In order to obtain spatial diversity gain for the 2-symbol PUCCH, a method of transmitting the 2-symbol PUCCH per antenna port may be considered. For example, two (2-symbol) PUCCH resources that are FDMed or CDMed per antenna port may be allocated to two antenna ports. In this case, the same UCI may be transmitted through a plurality of antenna ports. The same UCI may be repeatedly transmitted in each symbol in the 2-symbol PUCCH per antenna port or the UCI may be distributively transmitted in two symbols. As another method for obtaining spatial diversity gain, a 1-symbol PUCCH resource constituting a 2-symbol PUCCH resource may be dividedly transmitted through each antenna port. In this case, the same UCI may be transmitted through plural antenna ports or the UCI may be dividedly transmitted through two antenna ports.

Proposed Method #16 described above may be applied together in combination with other proposed methods of the present disclosure unless Proposed Method #16 is contradictory to the other proposed methods.

3.17 Proposed Method #17: Method of Multiplexing DM-RS Resources for N Antenna Ports (Hereinafter, N-Port DM-RSs) with Respect to a (1-Symbol or 2-Symbol) FDM-PUCCH by One of the Following Methods and Transmitting the FDM-PUCCH Using the N-Port DM-RSs (1) Option 1: CDM Different CSs, different FD-OCCs, or different TD-OCCs may be applied to DM-RS resources for different antenna ports. That is, the DM-RS resources for different antenna ports may have the same frequency resource but may have different code-domain resources (e.g., different CSs, FD-OCCs, or TD-OCCs).

(2) Option 2: FDM

The DM-RS resources for different antenna ports may be transmitted on different frequency resources (or REs). In this case, power boosting may be applied to at least one of a DM-RS transmission resource and a UCI transmission resource for each antenna port.

(3) Option 3: TDM

The DM-RS resources for different antenna ports may be transmitted on different time resources (or symbols). In this case, power boosting may be applied to at least one of the DM-RS transmission resource and the UCI transmission resource for each antenna port.

Additionally, one of the following operations may be performed using the afore-mentioned N-port DM-RS.

Option A: A (single) UE transmits the (1-symbol or 2-symbol) FDM-PUCCH by an SFBC scheme (per symbol) using the N-port DM-RS Option B: A (single) UE transmits the 2-symbol FDM-PUCCH by an STBC scheme in multiple symbols using the N-port DM-RS Option C: Different UEs transmit the (1-symbol or 2-symbol) FDM-PUCCH for each DM-RS port In the case of Option C, (CDM-based) multiplexing for M (1-symbol or 2-symbol) FDM-PUCCHs for up to M UEs may be supported by applying a length-M OCC to every REG composed of M REs in a (1-symbol or 2-symbol) FDM-PUCCH.

A single-port DM-RS resource of an FDM-PUCCH transmitted alone without multiplexing with another FDM-PUCCH may have a DM-RS pattern/sequence different from a single-port DM-RS resource of the FDM-PUCCH multiplexed with other (N−1) FDM-PUCCHs. For example, the single-port DM-RS resource of the FDM-PUCCH transmitted alone may have DM-RS density that is higher by N times. Upon transmitting the single-port FDM-PUCCH, the eNB may indicate which DM-RS pattern/sequence should be used through the DCI.

Figure 19:
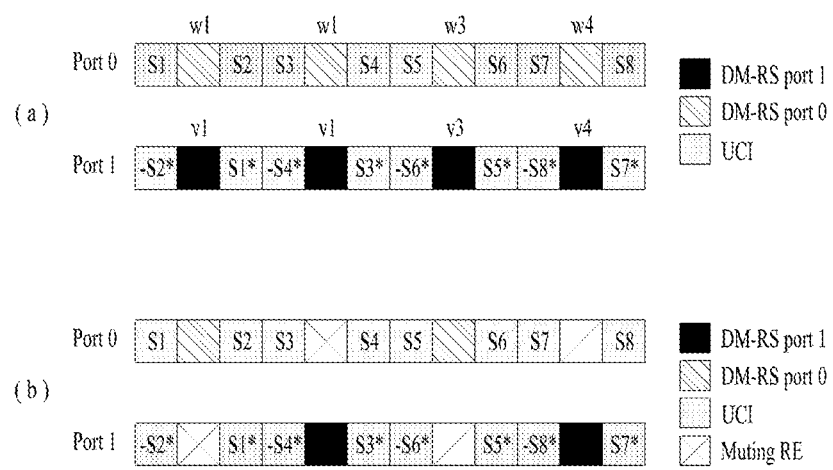
FIGS. 19(a) and 19(b) are diagrams illustrating a method of distinguishing between DM-RSs for plural antenna ports according to an embodiment.

FIGS. 19(a) and 19(b) are diagrams illustrating a method of distinguishing between DM-RSs for plural antenna ports according to an embodiment.

For example, when two antenna ports are supported for DM-RSs in a 1-symbol FDM-PUCCH, the SFBC scheme based on the two antenna ports may be applied. As illustrated in FIG. 19(a), different CSs or different FD-OCCs may be applied to DM-RS resources for plural antenna ports to distinguish between the DM-RSs. Alternatively, as illustrated in FIG. 19(b), different frequency resources may be allocated to the DM-RSs for the plural antenna ports to distinguish between the DM-RSs. Referring to FIGS. 19(a)

and 19(b), [S1, S2, S3, ... ] represents modulated symbols for UCI, and [w1, w2, ... ] and [v1, v2, ... ] represent different CSs or OCCs.

Figure 20:
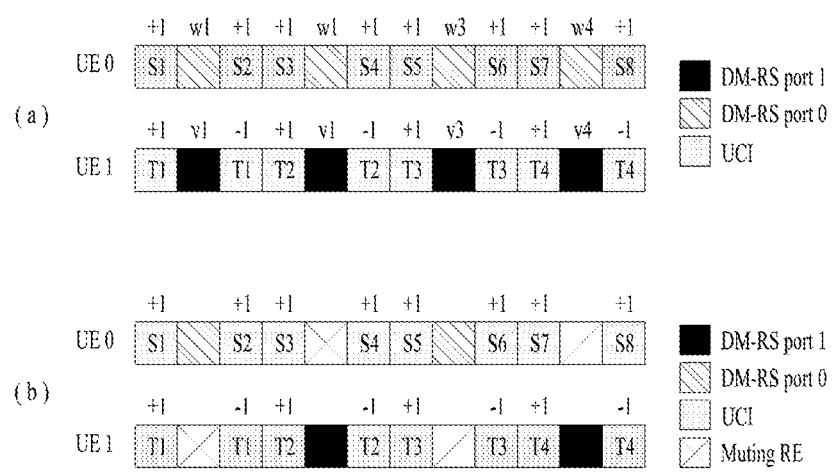
FIGS. 20(a) and 20(b) are diagrams illustrating a method of supporting multiplexing between PUCCHs including one symbol according to an embodiment.

FIGS. 20(a) and 20(b) are diagrams illustrating a method of supporting multiplexing between PUCCHs including one symbol according to an embodiment. In FIGS. 20(a) and 20(b), [S1, S2, S3, ... ] and [T1, T2, T3, ... ] represent modulated UCI symbols for UE 0 and UE 1, respectively.

When two antenna ports are supported for DM-RSs in a 1-symbol FDM-PUCCH, two UEs may transmit two multiplexed (1-symbol) FDM-PUCCHs using each corresponding antenna port. As illustrated in FIG. 20(a), DM-RSs may be distinguished by applying different CSs or different FD-OCCs to DM-RS resources for plural antenna ports. Alternatively, as illustrated in FIG. 20(b), the DM-RSs may be distinguished by allocating different frequency resources to the DM-RSs for plural antenna ports. Referring to FIGS. 20(a) and 20(b), multiplexing of two (1-symbol) FDM-PUCCHs for up to two UEs may be supported by applying length-2 OCCs (e.g., [+1+1] and [+1−1]) to every REG composed of two REs in a data region.

Figure 21:
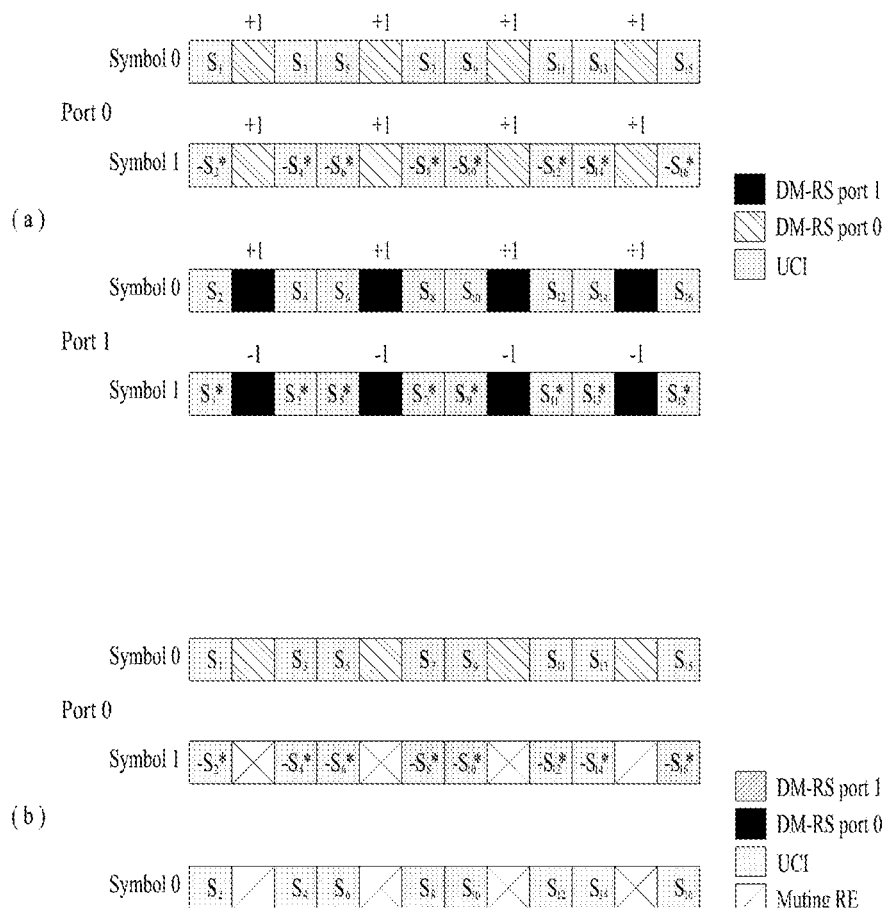
FIGS. 21(a) and 21(b) are diagrams illustrating a method of distinguishing DM-RSs for plural antenna ports according to an embodiment.

FIGS. 21(a) and 21(b) are diagrams illustrating a method of distinguishing DM-RSs for plural antenna ports according to an embodiment. In FIGS. 21(a) and 21(b), [S1, S2, S3, ... ] represents modulated symbols for UCI.

When two antenna ports are supported for DM-RSs in a 2-symbol FDM-PUCCH, the STBC scheme based on the two antenna ports is applied. As illustrated in FIG. 21(a), DM-RS resources for plural antenna ports are transmitted in two symbols to distinguish between the DM-RSs by applying different length-2 TD-OCCs (e.g., [+1+1] and [+1−1]). Alternatively, as illustrated in FIG. 21(b), DM-RSs for plural antenna ports are transmitted in each corresponding symbol to distinguish between the DM-RSs by allocating different time resources.

As an additional operation for Proposed Method #17, the following operations may be considered.

(1) Case in which a DM-RS resource for each antenna port supports N-port DM-RSs distinguished by FDM or TDM for SFBC or STBC A. Case in which one UE performs transmission on one FDM-PUCCH resource through one antenna port As Option 1-1, resources corresponding to all antenna ports among N-port DM-RS resources may be used as a DM-RS resource for an antenna port for actual transmission and an FD-OCC may not be applied to a UCI transmission region. As Option 1-2, a resource corresponding to a specific (single) antenna port among the N-port DM-RS resources may be used as a DM-RS resource for an antenna port for actual transmission and the FD-OCC may not be applied to the UCI transmission region. UCI may be additionally transmitted on a resource that is not used for actual DM-RS transmission among the N-port DM-RS resources.

B. Case in which two UEs perform transmission through each corresponding antenna port on one FDM-PUCCH resource As Option 2-1, a resource corresponding to a specific (single) antenna port among the N-port DM-RS resources (per UE) may be used as a DM-RS resource for an antenna port for actual transmission and the FD-OCC (which is different per UE) may be applied to the UCI transmission region. Power boosting may be applied to at least one of the DM-RS transmission resource and the UCI transmission resource.

C. Case in which one of Option 1-1 and Option 1-2, and Option 2-1 are performed

The eNB may indicate one of three options of {Option 1-X, Option 2-1 with DM-RS RE X (port 0), Option 2-1 with DM-RS RE Y (port 1)} through DCI (e.g., ARI).

D. Case in which a DM-RS resource per antenna port supports N-port DM-RSs distinguished by the TD-OCC or the FD-OCC for SFBC or STBC 1) Case in which one UE performs transmission on one FDM-PUCCH resource through one antenna port As Option 1-1, the TD-OCC or the FD-OCC may not be applied to a time and frequency resource corresponding to a specific antenna port and the time and frequency resource may be used as a DM-RS resource for an antenna port for actual transmission. The FD-OCC may not be applied to the UCI transmission region.

2) Case in which two UEs perform transmission through each corresponding antenna port on one FDM-PUCCH resource As Option 2-1, the TD-OCC or the FD-OCC may be applied to a time and frequency resource corresponding to a specific antenna port and the time and frequency resource may be used as a DM-RS resource for an antenna port for actual transmission. The TD-OCC or FD-OCC may be applied to the UCI transmission region.

3) Case in which Option 1-1 and Option 2-1 are performed

The eNB may indicate one of three options of {Option 1-1, Option 2-1 with DMRS OCC 1, Option 2-1 with DMRS OCC 2} through the DCI (e.g., ARI)

Proposed Method #17 described above may be applied together in combination with other proposed methods of the present disclosure unless Proposed Method #17 is contradictory to the other proposed methods.

3.18 Proposed Method #18: Method in which the eNB Configures, for the UE, One of Cases of UCI State-to-Sequence Mapping Satisfying Gray Encoding for the UE Through at Least One of a UE-Specific Higher Layer Signal or a Dynamic Control Signal with Respect to a 1-Symbol or 2-Symbol SEQ-PUCCH Transmission Resource for N-State UCI Transmission The eNB according to an embodiment may configure one of cases of UCI state-to-sequence mapping satisfying Gray encoding in terms of the frequency and/or code domain for a sequence for the UE through at least one of a UE-specific higher layer signal or a dynamic control signal. For example, the UE-specific higher layer signal and the dynamic control signal may include, without being limited to, RRC signaling and DCI, respectively.

In this case, the SEQ-PUCCH may mean a PUCCH transmission structure indicating one of N UCI states (e.g., log 2N bits) by selecting and transmitting one of N sequences. In addition, satisfying Gray encoding may mean that UCI state-to-sequence mapping is applied such that UCI between sequences having adjacent CS values in the same frequency in terms of the frequency and/or code domain for sequences (or most adjacent sequences in terms of a frequency/code resource) differs only by 1 bit.

For example, when the UE transmits 2-bit HARQ-ACK, 0, 3, 6, and 9 may be used among 12 CS values in one PRB. In this case, UCI state-to-sequence mapping for CS values 0, 3, 6, and 9 may be limited to 8 cases that satisfy Gray encoding as shown in Table 7 below.

TABLE 7

| CS | HARQ-ACK | | | | | | | |
|----|----|----|----|----|----|----|----|----|
| 0 | 00 | 00 | 01 | 01 | 10 | 10 | 11 | 11 |
| 3 | 01 | 10 | 11 | 00 | 11 | 00 | 01 | 10 |
| 6 | 11 | 11 | 10 | 10 | 10 | 01 | 00 | 00 |
| 9 | 10 | 01 | 00 | 11 | 00 | 11 | 10 | 01 |

Accordingly, when the eNB configures a PUCCH resource for HARQ-ACK transmission for the UE, the eNB may configure one of the above 8 cases of UCI state-to-sequence mapping in each PUCCH resource through the UE-specific higher layer signal. Accordingly, when PUCCH resources in a cell are multiplexed, the eNB may coordinate UCI state-to-sequence mapping so as to reduce an interference effect between the multiplexed PUCCH resources.

In addition, as an additional operation of Proposed Method #18, UCI state-to-sequence mapping applied to a 1-symbol or 2-symbol SEQ-PUCCH transmission resource for transmitting N-state UCI may be configured to be changed on a slot (or symbol) basis according to a specific pattern scheduled between the UE and the eNB. In this case, UCI state-to-sequence mapping applied to a specific timing may be selected only from a set of UCI state-to-sequence mapping satisfying Gray encoding in terms of the frequency and/or code domain for a sequence.

Proposed Method #18 described above may be applied together in combination with other proposed methods of the present disclosure unless Proposed Method #18 is contradictory to the other proposed methods.

3.19 Proposed Method #19: Method of Distributing Coded UCI Bits to Two FDM Symbols when the Coded UCI Bits are Transmitted Through a 2-Symbol FDM-PUCCH According to an embodiment, the coded UCI bits may be distributed to two FDM symbols and transmitted through the 2-symbol FDM-PUCCH.

For example, the UE may apply bit/RE-level interleaving to the coded UCI bits and perform RE mapping according to frequency-first mapping (or time-first mapping), thereby distributing the coded UCI bits to two FDM symbols. For example, the UE may perform RE mapping for a frequency resource in the first symbol with respect to the coded UCI bits and perform RE mapping for a frequency resource in the second symbol with respect to the coded UCI bits.

As another example, the UE may perform time-first mapping for the coded UCI bits. In this case, the UE may alternately perform RE mapping for the coded UCI bits in two OFDM symbols.

When the coded UCI bits are transmitted in two OFDM symbols, a scrambling seed applied to the UCI may be differently (or independently) applied according to a symbol.

For example, when the UE transmits the coded UCI bits through the 2-symbol FDM-PUCCH and frequency hopping is applied to the 2-symbol FDM-PUCCH, the coded UCI bits should be sufficiently interleaved in order to maximize frequency diversity experienced by the coded UCI bits. In order to sufficiently interleave the coded UCI bits, the UE may apply sufficient interleaving in a rate-matching process after a channel coding process of generating the coded UCI bits and perform RE mapping for the coded UCI bits. However, when the payload size of the UCI is relatively small, interleaving may not be applied because there is no separate rate matching process. Accordingly, the present disclosure proposes a method of applying additional bit/RE-level interleaving to the coded UCI bits and applying RE mapping (e.g., frequency-first mapping or time-first mapping). In addition, in the present disclosure, the coded UCI bits may be subjected to RE mapping according to a time-first mapping scheme without additional bit/RE-level interleaving and may be distributed to two OFDM symbols.

Proposed Method #19 described above may be applied together in combination with other proposed methods of the present disclosure unless Proposed Method #19 is contradictory to the other proposed methods.

3.20 Proposed Method #20: Method of Configuring, Using M RBGs, an Area in which a 1-Symbol or 2-Symbol Short-PUCCH is Transmitted in Terms of a Cell, Configuring Logical RBG Indexes and Physical RBG Indexes for the M RBGs, and then Changing Logical RBG to Physical RBG Mapping According to a Slot and/or a Symbol or According to a Pattern Scheduled Between the eNB and the UE, when L RBs Constitute One RBG In this case, the UE may be assigned a transmission resource on the frequency axis for the 1-symbol or 2-symbol short-PUCCH in terms of the logical RBG indexes, and the short-PUCCH from a physical perspective may be transmitted in physical RGBs reinterpreted according to logical RBG to physical RBG mapping. In addition, the RB may mean a resource allocation unit on the frequency axis and one RB may be composed of a plurality of adjacent subcarriers. The same precoding may be applied or assumed in the same RBG.

For example, 1 to 8 RBs may be allocated to the short-PUCCH that transmits UCI larger than 2 bits according to the payload size of the UCI. When a plurality of RBs is allocated, the allocated plural RBs may include contiguous RBs. In this case, the same precoding may be applied in the same RB.

In addition, in terms of inter-cell interference randomization, a method of changing (or hopping) a frequency resource on which the short-PUCCH is transmitted for each slot and/or each symbol may be considered. If one short-PUCCH resource includes 1 to 8 RBs, a resource unit in which a frequency resource of one short-PUCCH is changed for each slot and/or symbol may be desirably set to the maximum number of RBs (e.g., 8 RBs) capable of being allocated to one short-PUCCH resource. Otherwise, an interference characteristic from a neighboring cell in terms of a specific short-PUCCH may be changed in a PRB allocated to the UE and inter-cell interference randomization between neighboring eNBs may not be easy.

Proposed Method #20 described above may be applied together in combination with other proposed methods of the present disclosure unless Proposed Method #20 is contradictory to the other proposed methods.

3.21 Proposed Method #21: Method in which the eNB Transmits Information about the Payload Size and Coding Rate of UCI to be Transmitted Through a PUCCH to the UE and the UE Derives the Number of RBs Allocated to PUCCH Resources Based on the Information about the Payload Size and Coding Rate of the UCI According to an embodiment, the eNB may transmit the information about the payload size and coding rate of the UCI to be transmitted through the PUCCH to the UE. In this case, the information may be transmitted through at least one of a higher layer signal (e.g., RRC signaling) or a dynamic control signal (e.g., DCI). The UE may derive the number of RBs allocated to the PUCCH resource based on the received information. In this case, the information about the coding rate may be the ratio of a coding rate reference value determined according to the payload size of the UCI. In addition, the RB means a resource allocation unit on the frequency axis and one RB may be composed of a plurality of adjacent subcarriers.

For example, the eNB may configure a starting RB index for the UE as a PUCCH transmission resource and determine the number of RBs to be actually used according to the payload size of the UCI. In this case, if there is no additional information about the coding rate, the UE may determine the number of RBs always on the assumption of the worst case so as to achieve the most reliable coding rate. Therefore, in actuality, in a situation in which PUCCH transmission is sufficiently reliable even if the coding rate is high because the UE is adjacent to the eNB, resources of the RB may be unnecessarily wasted. Accordingly, the present disclosure proposes a method in which the eNB transmits the information about the payload size and the coding rate of the UCI for the UCI to be transmitted through the PUCCH to the UE and the UE determines the number of RBs based on the information about the payload size of the UCI and the information about the coding rate of the UCI.

Proposed Method #21 described above may be applied together in combination with other proposed methods of the present disclosure unless Proposed Method #21 is contradictory to the other proposed methods.

4. Device Configuration

Figure 22:
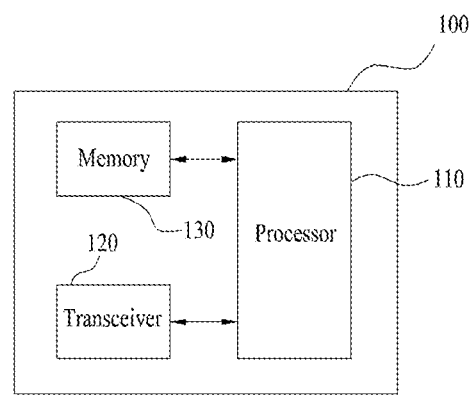
FIG. 22 is a diagram illustrating a configuration of a user equipment according to an embodiment of the present disclosure.

FIG. 22 illustrates a configuration of a user equipment (UE) in accordance with an embodiment of the present disclosure.

The UE 100 illustrated in FIG. 22 may perform signal transmission operations of the UE illustrated in FIG. 1 to FIG. 21.

The UE 100 in accordance with an embodiment of the present disclosure may operate as a transmission end on uplink and may operate as a reception end on downlink.

The UE 100 in accordance with an embodiment of the present disclosure may comprise a processor 110 and a transceiver 120. However, the UE 100 may be implemented with more elements than illustrated, or may be implemented with one element by combining two or more elements. For example, the UE 100 may further include a memory 130 and an antenna in addition to the processor 110 and the 120. According to an embodiment, one transceiver may be separately implemented as a transmitter and a receiver. Hereinafter, each element will be described.

The processor 110 controls overall operations of the UE 100.

The processor 110 according to an embodiment may allocate resources for transmitting a PUCCH composed of two or less symbols to a plurality of antenna ports and control the transceiver to transmit the PUCCH to the BS through the plural antenna ports. The resources allocated to the plural antenna ports may be multiplexed. In this case, the PUCCH including two or less symbols may mean the short-PUCCH described with reference to FIGS. 1 to 21.

When the PUCCH is composed of two symbols, resources for transmitting the two symbols may be allocated to each of the plural antenna ports and the same UCI may be transmitted through each of the plural antenna ports. The UCI transmitted through each of the plural antenna ports may be repeatedly transmitted on two symbols allocated to each of the plural antenna ports or may be dividedly transmitted in the two symbols.

When the PUCCH is composed of two symbols, resources for transmitting the two symbols may be dividedly allocated to the plural antenna ports and the processor 110 may control the transceiver 120 to transmit the same UCI on a resource allocated to each of the plural antenna ports.

In addition, the processor 110 may control the transceiver 120 to multiplex a DM-RS corresponding to each of the plural antenna ports according to a CDM, FDM, or TDM scheme and then transmit the DM-RS. When the DM-RS corresponding to each of the plural antenna ports is multiplexed according to the CDM scheme, the DM-RS corresponding to each of the plural antenna ports may be multiplexed by differently applying a CS, an FD-OCC, or a TD-OCC.

The PUCCH may have a first PUCCH structure or a second PUCCH structure. The first PUCCH structure may be a structure based on a sequence selected based on UCI transmitted through the PUCCH from among a plurality of sequences allocated by the BS, and the second PUCCH structure may be a structure multiplexed by a resource for transmitting the UCI and a resource for transmitting an RS according to an FDM scheme. For example, the first PUCCH structure may include the above-described SEQ-PUCCH structure and the second PUCCH structure may include an FDM-PUCCH structure.

The processor 110 may perform control such that a different TxD scheme is applied based on whether frequency hopping is applied to the two or less symbols constituting the PUCCH.

For example, when the PUCCH is a PUCCH composed of two symbols with the first PUCCH structure, a TxD scheme may be differently applied based on whether frequency hopping is applied to the two symbols. For example, when frequency hopping is applied, an SORTD scheme may be applied as the transmit diversity scheme, and when frequency hopping is not applied, the SORTD scheme or an STBC scheme may be selectively applied as the transmit diversity scheme.

In addition, when the PUCCH is a PUCCH composed of two symbols with the second PUCCH structure, the TxD scheme may be differently applied based on whether frequency hopping is applied to the two symbols. For example, when the frequency hopping is applied, an SFBC scheme may be applied as the TxD scheme, and when the frequency hopping is not applied, the SFBC scheme or the STBC scheme may be selectively applied as the TxD scheme.

The transceiver 120 of the UE 100 according to an embodiment may perform, without being limited to, a packet modulation/demodulation function for data transmission and reception, a high-speed packet channel coding function, OFDMA packet scheduling, TDD packet scheduling, and/or channelization. According to an embodiment, the UE 100 may further include a low-power Radio Frequency (RF)/Intermediate Frequency (IF) module.

Meanwhile, the UE 100 according to an embodiment may include, without being limited to, a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smartphone, a Multi-Mode Multi-Band (MM-MB) terminal, etc. For example, the smartphone refers to a terminal taking the advantages of both a mobile communication terminal and a PDA and may be a terminal which incorporates functions of the PDA, i.e., a scheduling function and a data communication function such as fax transmission and reception and Internet connection, into the mobile communication terminal. The MB-MM terminal refers to a terminal which has a multi-modem chip built therein and which can operate in any of a mobile Internet system and other mobile communication systems (e.g. Code Division Multiple Access (CDMA) 2000, Wideband CDMA (WCDMA), etc.).

Figure 23:
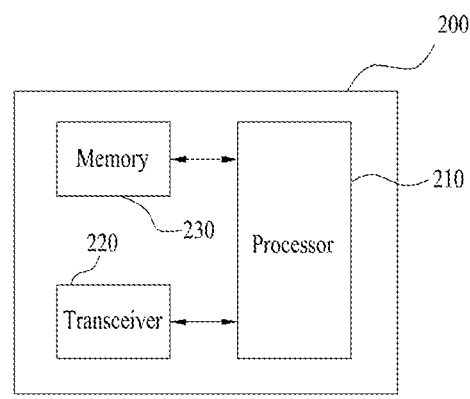
FIG. 23 is a diagram illustrating a configuration of a base station according to an embodiment of the present disclosure.

FIG. 23 illustrates a configuration of a base station (BS) in accordance with an embodiment of the present disclosure.

The BS 200 illustrated in FIG. 23 may perform signal reception operations of the BS illustrated in FIG. 1 to FIG. 21.

The BS 200 according to an embodiment may include a processor 210 and a transceiver 220. However, the BS 200 may be implemented by elements more than the elements illustrated or by one element generated by combining two or more elements. For example, the BS 200 may further include a memory 230 and an antenna in addition to the processor 210 and the transceiver 220.

The processor 210 according to an embodiment may allocate a resource for transmitting a PUCCH to a UE and control the transceiver to receive the PUCCH through a plurality of antenna ports of the UE based on the allocated resource. In this case, the PUCCH may be composed of two or less symbols and the resource for transmitting the PUCCH may be allocated to the plural antenna ports. The resource allocated to the plural antenna ports may be multiplexed.

The transceiver 220 according to an embodiment may control transmission and reception of signals, information, data, and/or messages.

Embodiments of the present disclosure may be implemented by various means, for example, hardware, firmware, software, or a combination thereof.

In a hardware implementation, the present disclosure may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc, to which the present disclosure is not limited.

In a firmware or software implementation, the present disclosure may be implemented in the form of a module, a procedure, a function, etc. for performing the above-described functions or operations. A program including the module, the procedure, the function, etc. for performing the above-described functions or operations may be stored in the memory (130, 230) and executed by the processor (110, 210).

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

Embodiments of the present disclosure are applicable to various wireless access systems. For example, the wireless access systems may include, without being limited to, a 3GPP system and/or a 3GPP2 system. The embodiments of the present disclosure are applicable to all technical fields applying the above-described wireless access systems as well as the above-described wireless access system. Moreover, the present disclosure may also be applied to a mmWave communication system using an ultra-high frequency band.

The invention claimed is:

1. A method of transmitting a signal by a User Equipment (UE) to a Base Station (BS) in a wireless communication system, the method comprising:
    allocating 2 symbols for a Physical Uplink Control Channel (PUCCH) to a plurality of antenna ports; and
    transmitting, to the BS, the PUCCH through the plurality of antenna ports,
    wherein resources included in the 2 symbols are multiplexed,
    wherein, based on that a frequency hopping is applied, a Spatial Orthogonal Resource Transmit Diversity (SORTD) scheme is applied as the transmit diversity scheme for the 2 symbols, and
    wherein, based on that (i) the frequency hopping is not applied and (ii) a reference signal (RS) for the PUCCH and Uplink Control Information (UCI) for the PUCCH are interlaced in a symbol, a Space Time Block Coding (STBC) scheme is applied as the transmit diversity scheme for the 2 symbols.

2. The method of claim 1, wherein the 2 symbols are allocated to each of the plurality of antenna ports and the same UCI is transmitted through each of the plurality of antenna ports.

3. The method of claim 1, wherein Demodulation Reference Signals (DM-RSs) for each of the antenna ports are multiplexed based on a Code Division Multiplexing (CDM), Frequency Division Multiplexing (FDM), or Time Division Multiplexing (TDM) scheme.

4. The method of claim 3, wherein based on the DM-RSs being multiplexed using the CDM scheme, the DM-RSs are multiplexed by applying different Cyclic Shifts (CSs), different Frequency-Domain Orthogonal Cover Codes (FD-OCCs), or different Time-Domain Orthogonal Cover Codes (TD-OCCs).

5. The method of claim 1,
    wherein, based on (i) the PUCCH being generated by multiplexing the UCI and the RS based on a Frequency Division Multiplexing (FDM) scheme and (ii) the frequency hopping being applied, a Space Frequency Block Coding (SFBC) scheme is applied as the transmit diversity scheme for the 2 symbols, and
    wherein, based on (i) the PUCCH being generated by multiplexing the UCI and the RS based on a Frequency Division Multiplexing (FDM) scheme and (ii) the frequency hopping being not applied, the STBC scheme is selectively applied as the transmit diversity scheme for the 2 symbols.

6. A method of receiving a signal by a Base Station (BS) from a User Equipment (UE) in a wireless communication system, the method comprising:
    allocating 2 symbols for a Physical Uplink Control Channel (PUCCH) to the UE; and
    receiving the PUCCH through a plurality of antenna ports of the UE based on the the 2 symbols,
    wherein resources included in the 2 symbols are multiplexed,
    wherein, based on that a frequency hopping is applied, a Spatial Orthogonal Resource Transmit Diversity (SORTD) scheme is applied as the transmit diversity scheme for the 2 symbols, and wherein, based on that (i) the frequency hopping is not applied and (ii) a reference signal (RS) for the PUCCH and Uplink Control Information (UCI) for the PUCCH are interlaced in a symbol, a Space Time Block Coding (STBC) scheme is applied as the transmit diversity scheme for the 2 symbols.

7. A User Equipment (UE) for transmitting a signal to a Base Station (BS) in a wireless communication system, the UE comprising:
  a transceiver; and
  a processor,
  wherein the processor is configured to:
    allocate 2 symbols for a Physical Uplink Control Channel (PUCCH) to a plurality of antenna ports; and
    control the transceiver to transmit, to the BS, the PUCCH through the plurality of antenna ports, and
  wherein resources included in the 2 symbols are multiplexed,
  wherein, based on that a frequency hopping is applied, a Spatial Orthogonal Resource Transmit Diversity (SORTD) scheme is applied as the transmit diversity scheme for the 2 symbols, and
  wherein, based on that (i) the frequency hopping is not applied and (ii) a reference signal (RS) for the PUCCH and Uplink Control Information (UCI) for the PUCCH are interlaced in a symbol, a Space Time Block Coding (STBC) scheme is applied as the transmit diversity scheme for the 2 symbols.

8. A Base Station (BS) for receiving a signal from a User Equipment (UE) in a wireless communication system, the BS comprising:
  a transceiver; and
  a processor,
  wherein the processor is configured to:
    allocate 2 symbols for a Physical Uplink Control Channel (PUCCH) to the UE and
    control the transceiver to receive the PUCCH through a plurality of antenna ports of the UE based on the 2 symbols,
  wherein resources included in the 2 symbols are multiplexed,
  wherein, based on that a frequency hopping is applied, a Spatial Orthogonal Resource Transmit Diversity (SORTD) scheme is applied as the transmit diversity scheme for the 2 symbols, and
  wherein, based on that (i) the frequency hopping is not applied and (ii) a reference signal (RS) for the PUCCH and Uplink Control Information (UCI) for the PUCCH are interlaced in a symbol, a Space Time Block Coding (STBC) scheme is applied as the transmit diversity scheme for the 2 symbols.

* * * * *